(12) United States Patent
An et al.

(10) Patent No.: US 12,292,387 B2
(45) Date of Patent: May 6, 2025

(54) APPARATUS AND METHOD FOR INSPECTING LASER DEFECT INSIDE OF TRANSPARENT MATERIAL

(71) Applicant: CORNING INCORPORATED, Corning, NY (US)

(72) Inventors: Chong Pyung An, Painted Post, NY (US); En Hong, Painted Post, NY (US); Tian Huang, San Jose, CA (US); Yuhui Jin, Painted Post, NY (US); Philip Robert LeBlanc, Corning, NY (US); Garrett Andrew Piech, Corning, NY (US)

(73) Assignee: Corning Incorporated, Corning, NY (US)

( * ) Notice: Subject to any disclaimer, the term of this patent is extended or adjusted under 35 U.S.C. 154(b) by 139 days.

(21) Appl. No.: 17/928,005

(22) PCT Filed: May 25, 2021

(86) PCT No.: PCT/US2021/033996
§ 371 (c)(1),
(2) Date: Nov. 28, 2022

(87) PCT Pub. No.: WO2021/247281
PCT Pub. Date: Dec. 9, 2021

(65) Prior Publication Data
US 2023/0221261 A1 Jul. 13, 2023

Related U.S. Application Data

(60) Provisional application No. 63/033,921, filed on Jun. 3, 2020.

(51) Int. Cl.
*G01N 21/88* (2006.01)
*G01N 21/958* (2006.01)

(52) U.S. Cl.
CPC ..... *G01N 21/8806* (2013.01); *G01N 21/8851* (2013.01); *G01N 21/958* (2013.01);
(Continued)

(58) Field of Classification Search
CPC ........... G01N 21/8806; G01N 21/8851; G01N 21/958; G01N 2021/8822;
(Continued)

(56) References Cited

U.S. PATENT DOCUMENTS 6,621,572 B2  9/2003  Savareigo
9,517,963 B2  12/2016 Marjanovic et al.
(Continued)

FOREIGN PATENT DOCUMENTS

CN    1908638 A    2/2007
CN    110827256 A   2/2020
(Continued)

OTHER PUBLICATIONS

International Search Report and Written Opinion of the International Searching Authority; PCT/US2021/033996; dated Sep. 9, 2021; 13 pages; European Patent Office.
(Continued)

*Primary Examiner* — Md M Rahman
(74) *Attorney, Agent, or Firm* — Womble Bond Dickinson (US) LLP

(57) ABSTRACT

A method for inspecting a transparent workpiece comprises: directing light from an illumination source onto a plurality of defects formed in the transparent workpiece, wherein the plurality of defects extends in a defect direction, wherein the transparent workpiece comprises a first surface and a second surface; detecting a scattering image signal from light scattered by the plurality of defects using an imaging system, wherein an imaging axis of the imaging system extends at a non-zero imaging angle relative to the defect direction,
(Continued)

wherein entireties of at least a subset of the plurality of defects are within a depth of field of the imaging system; and generating a three-dimensional image of at least one of the plurality of defects based on the scattering signal.

20 Claims, 20 Drawing Sheets

(52) U.S. Cl.
CPC ................ *G01N 2021/8822* (2013.01); *G01N 2021/8887* (2013.01)

(58) Field of Classification Search
CPC .......... G01N 2021/8887; B23K 26/032; B23K 26/0622; B23K 26/53
USPC ...................................................... 356/237.1
See application file for complete search history.

(56) References Cited

U.S. PATENT DOCUMENTS

| | | | |
|---|---|---|---|
| 10,293,436 B2 | 5/2019 | Marjanovic et al. | |
| 10,522,963 B2 | 12/2019 | Comstock et al. | |
| 10,730,783 B2 | 8/2020 | Akarapu et al. | |
| 11,078,112 B2 | 8/2021 | Dahlberg et al. | |
| 2018/0029924 A1 | 2/2018 | Inoue et al. | |
| 2018/0093914 A1 | 4/2018 | Akarapu et al. | |
| 2019/0321921 A1 | 10/2019 | Paris et al. | |

FOREIGN PATENT DOCUMENTS

| | | |
|---|---|---|
| CN | 111220615 A | 6/2020 |
| DE | 102009050711 A1 | 5/2011 |
| JP | 2009000928 A | 1/2009 |
| TW | 200928286 A | 7/2009 |

OTHER PUBLICATIONS

Taiwanese Patent Application No. 110119424, Office Action dated Oct. 21, 2024, 2 pages (English Translation only), Taiwanese Patent Office.

Zhang, Xiao, Fabrication of Vacuum-Sealed Capacitive Micromachined Ultrasonic Transducers With Through-Glass-Via Interconnects Using Anodic Bonding, Journal of Microelectromechanical System, 2017, vol. 26, Issue 1, p. 226-234.

Japanese Office action for Application No. 2022-574430, dated Jan. 29, 2025, 10 pages.

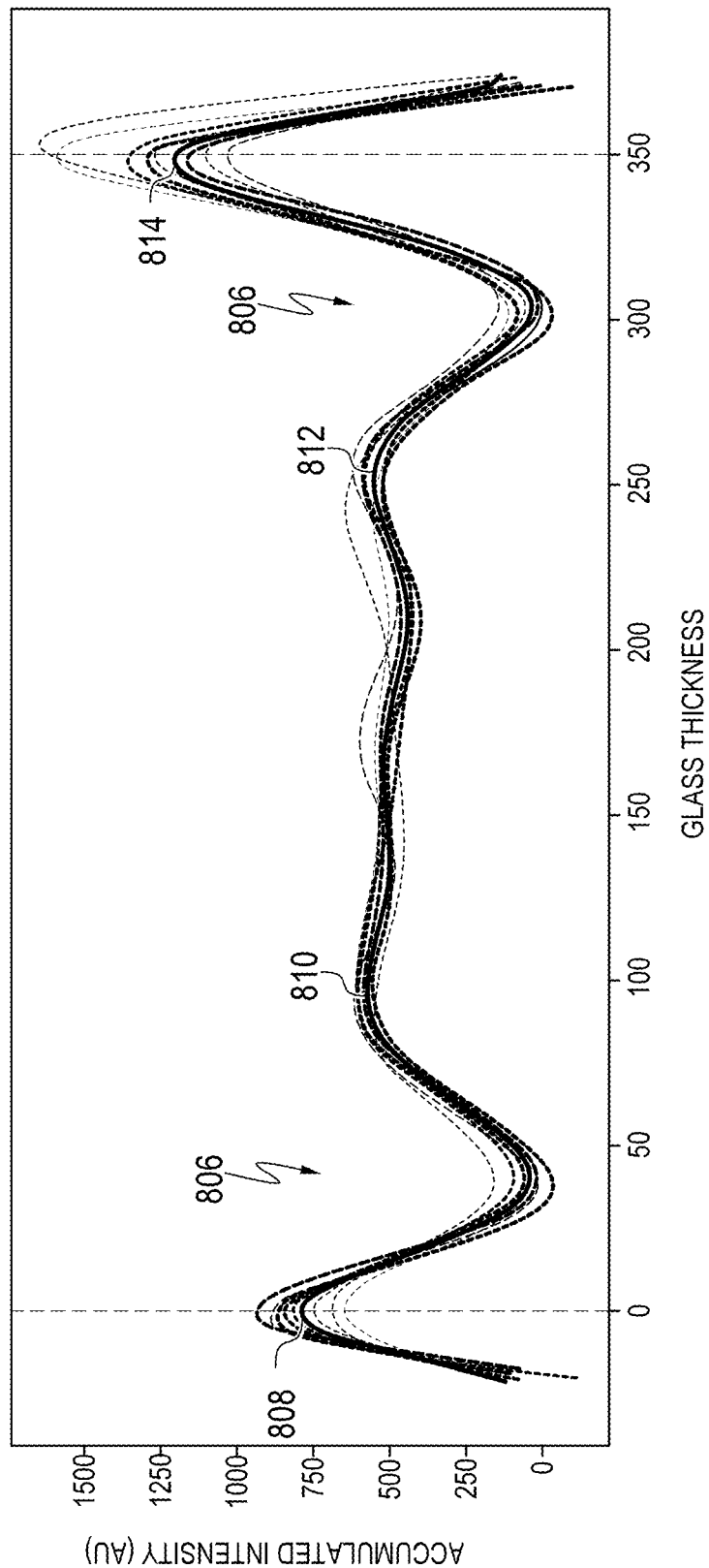

APPARATUS AND METHOD FOR INSPECTING LASER DEFECT INSIDE OF TRANSPARENT MATERIAL

CROSS-REFERENCE TO RELATED APPLICATIONS

This application claims the benefits of priority under 35 U.S.C. § 371 of International Application Serial No.: PCT/US2021/033996, filed on May 25, 2021, which claims the benefit of priority under 35 U.S.C. § 119 of U.S. Provisional Application Ser. No. 63/033,921 filed on Jun. 3, 2020, the contents of which are relied upon and incorporated herein by reference in their entirety.

BACKGROUND

Field

The present specification generally relates to methods and apparatuses for characterizing a laser defect formed inside of a transparent workpiece.

Technical Background

Substrates, such as silicon, have been used as an interposer disposed between electrical components (e.g., printed circuit boards, integrated circuits, and the like). Metalized through-substrate vias provide a path through the interposer for electrical signals to pass between opposite sides of the interposer. Glass is a substrate material that is highly advantageous for electrical signal transmission, as it has dimensional stability, a tunable coefficient of thermal expansion ("CTE"), very good low electrical loss at high frequencies electrical performance, high thermal stability, and an ability to be formed at thickness and at large panel sizes. However, through-glass via ("TGV") formation and metallization present challenges in development of glass interposer markets. Proper control of TGV profile and geometry is needed to produce reliable interposers.

TGVs may be produced by a laser-damage-and-etch process where defects are initially formed in a transparent workpiece using a laser and a chemical etching solution is applied to the transparent workpiece to form the vias at the defects. The form and profile of vias produced by the laser-damage-and-etch process is controlled largely by the damage profile of the defects created by the laser. Given this, inspection of the as-formed defects is a critical step for processing monitoring and quality control.

Existing methods for characterizing the defects involve dicing the substrate close to the defects and polishing the diced edge for side-view optical microscopy imaging. If higher resolution is needed, the edge of the sample needs to be further polished down to within 10 µm from the defects, then exposed by ablation with a focused ion beam to expose the damage tracks so that a scanning electron microscope can image. These processes are destructive, time consuming, expensive, and can only sample a very small fraction of the total number of damage tracks per substrate. Moreover, it is difficult to quantify characteristics of the defects (e.g., the damage pattern) based on the images obtained through such conventional techniques.

Accordingly, a new system and method for inspecting defects that is more efficient and less costly is needed.

SUMMARY

According to first aspect of the present disclosure a method for inspecting a transparent workpiece comprises: directing light from an illumination source onto a plurality of defects formed in the transparent workpiece, wherein the plurality of defects extends in a defect direction, wherein the transparent workpiece comprises a first surface and a second surface; detecting a scattering image signal from light scattered by the plurality of defects using an imaging system, wherein an imaging axis of the imaging system extends at a non-zero imaging angle relative to the defect direction, wherein entireties of at least a subset of the plurality of defects are within a depth of field of the imaging system; and generating a three-dimensional image of at least one of the plurality of defects based on the scattering signal.

A second aspect of the present disclosure includes the method of the first aspect, wherein the plurality of defects comprise regions of the transparent workpiece where a refractive index of the transparent workpiece has been modified, each of the plurality of defects having an aspect ratio that is a ratio of a length of a defect to a width of a defect, wherein the aspect ratio of each of the plurality of defects is greater than or equal to 20:1.

A third aspect of the present disclosure includes the method of the second aspect, wherein each of the plurality of defects comprises an aspect ratio of greater than or equal to 50:1.

A fourth aspect of the present disclosure includes the method of the second aspect, wherein each of the plurality of defects comprises an aspect ratio of greater than or equal to 100:1.

A fifth aspect of the present disclosure includes the method of any of the first through fourth aspects, wherein the plurality of defects comprise regions of the transparent workpiece where a refractive index of the transparent workpiece has been modified by exposure to a quasi-non-diffracting laser beam.

A sixth aspect of the present disclosure includes the method of any of the first through fifth aspects, wherein the imaging system comprises a first camera and a first imaging lens disposed on the imaging axis, wherein the first camera comprises an area scan camera or a line scan camera, wherein the non-zero imaging angle is from 30 degrees to 60 degrees relative to the defect direction.

A seventh aspect of the present disclosure includes the method of the sixth aspect, wherein the first imaging lens comprises a magnification factor and a numerical aperture that are dependent on a thickness of the transparent workpiece.

An eighth aspect of the present disclosure includes the method of the seventh aspect, wherein the thickness of the transparent workpiece is from 300 µm to 700 µm, wherein the magnification factor is less than 3, wherein the numerical aperture is less than 0.2.

A ninth aspect of the present disclosure includes the method of the sixth aspect, wherein the first camera comprises a line scan camera, wherein generating the three-dimensional image includes moving the transparent workpiece relative to the imaging system to bring additional portions of the plurality of defects within a field of view of the first camera.

A tenth aspect of the present disclosure includes the method of any of the sixth through ninth aspects, wherein the imaging system comprises second camera and a second imaging lens disposed on a second imaging axis of the imaging system.

An eleventh aspect of the present disclosure includes the method of the tenth aspect, wherein: the first camera and first imaging lens are configured to image first portions of the plurality of defects extending from the first surface, and the second camera and the second imaging lens are configured to image second portions of the plurality of defects extending from the second surface such that the first and second cameras, in combination, image the entireties of the subset of the plurality of defects.

A twelfth aspect of the present disclosure includes the method of any of the first through eleventh aspects, wherein the defect direction is perpendicular to the first and second surfaces of the transparent workpiece.

A thirteenth aspect of the present disclosure includes the method of any of the first through twelfth aspects, wherein the scattering image signal is a dark field scattering image signal.

A fourteenth aspect of the present disclosure includes a method of the thirteenth aspect, wherein generating the three-dimensional image comprises generating an intensity profile for a portion of the dark field scattering image signal corresponding to a defect of the plurality of defects.

A fifteenth aspect of the present disclosure includes a method of the fourteenth aspect, further comprising determining a quantitative characteristic of the defect based on the intensity profile.

A sixteenth aspect of the present disclosure includes the method of any of the first through fifteenth aspects, wherein the defect comprises a damage pattern that varies as a function of depth in the transparent workpiece.

A seventeenth aspect of the present disclosure includes the method of the sixteenth aspect, wherein the damage pattern comprises a first portion extending from the first surface, a second portion extending from the second surface, and a third portion extending between the first and second portions, wherein the transparent workpiece has higher levels of modification in the first and second portions as compared to the third portion, wherein the quantitative characteristic of the defect comprises a ratio of a length of the first portion to a length of the second portion.

A eighteenth aspect of the present disclosure includes the method of the fifteenth aspect, wherein determining the quantitative characteristic of the defect based on the intensity profile comprises comparing the intensity profile to an existing intensity profile measured with respect to a reference defect using a computing system.

A nineteenth aspect of the present disclosure includes the method of any of the first through eighteenth aspects, wherein directing the light from the illumination source onto the plurality of defects comprises directing the light from the illumination source through an edge of the transparent workpiece.

A twentieth aspect of the present disclosure includes the method of any of the first through nineteenth aspects, wherein directing the light from the illumination source onto a plurality of defects comprises directing the light from the illumination source onto the first surface of the transparent workpiece at an illumination angle, wherein the illumination angle is different from the angle of the imaging axis.

According to a twenty first aspect of the present disclosure, a method of characterizing a laser processing system for forming a defect in a transparent workpiece comprises: forming a defect in the transparent workpiece using the laser processing system, wherein the laser processing system is configured to direct a defect forming laser beam into the transparent workpiece to form the defect using a defect forming optical system, wherein the transparent workpiece comprises a first surface and a second surface, wherein the defect extends in a defect direction; after formation of the defect, directing light from an illumination source onto the defect; detecting a dark field scattering image signal of light scattered from the defect using an imaging system, wherein an imaging axis of the imaging system is disposed at a non-zero imaging angle relative to the defect direction; generating an intensity profile for the defect using the dark field scattering image signal; and determining a characteristic of the laser processing system based on the intensity profile.

A twenty second aspect of the present disclosure includes the method of the twenty first aspect, wherein the defect forming optical system is configured to direct the defect forming laser beam into a laser beam focal line that at least partially overlaps the transparent workpiece.

A twenty third aspect of the present disclosure includes the method of the twenty first aspect of the twenty second aspect, wherein determining the characteristic of the laser processing system includes determining a focusing position of the defect forming optical system based on the intensity profile A twenty fourth aspect of the present disclosure includes the method of the twenty third aspect, wherein determining the focusing position of the defect forming optical system based on the intensity profile includes estimating a length ratio of high damage portions of the defect based on a peak distribution of the intensity profile.

A twenty fifth aspect of the present disclosure includes the method of the twenty fourth aspect, further comprising adjusting the focusing position of the defect-forming optical system relative to the transparent workpiece based on the estimated length ratio and forming a modified defect using the adjusted focusing position having a desired length ratio of the high damage portions.

A twenty sixth aspect of the present disclosure includes the method of any of the twenty first through twenty fifth aspects, wherein the illumination source and imaging system are integrated into the laser processing system.

A twenty seventh aspect of the present disclosure includes the method of any of the twenty first through twenty sixth aspects, wherein directing the light from the illumination source onto the defect comprises directing the light from the illumination source through an edge of the transparent workpiece.

A twenty eighth aspect of the present disclosure includes the method of any of the twenty first through twenty seventh aspects, wherein directing the light from the illumination source onto the defect comprises directing the light from the illumination source onto the first surface of the transparent workpiece at an illumination angle, wherein the illumination angle is different from the non-zero imaging angle.

A twenty ninth aspect of the present disclosure the method of any of the twenty first through twenty eighth aspects, wherein the imaging system comprises a camera and an imaging lens disposed on the imaging axis, wherein the camera comprises an area scan camera or a line scan camera, wherein the non-zero imaging angle is from 30 degrees to 60 degrees.

According to a thirtieth aspect a method of characterizing a laser processing system comprises: directing light from an illumination source onto a plurality of defects formed in a transparent workpiece using the laser processing system, wherein the defects extend in a defect direction, wherein the transparent workpiece comprises a first surface and a second surface; detecting a dark field scattering image signal from light scattered by the plurality of defects using an imaging system, wherein an imaging axis of the imaging system is disposed at a non-zero imaging angle to the defect direction; generating intensity profiles for the plurality of defects using the dark field scattering image signal; chemically etching the transparent workpiece to form a plurality of vias in the transparent workpiece in positions corresponding to the plurality of defects; generating an image of a via of the plurality of vias; and comparing the image of the via with an intensity profile corresponding to the defect from which the via was formed.

A thirty first aspect of the present disclosure includes the method of the thirtieth aspect, further comprising forming the plurality of defects in the transparent workpiece using the laser processing system, wherein the laser processing system is configured to direct a defect forming laser beam into the transparent workpiece to form the defect with a defect forming optical system.

A thirty second aspect of the present disclosure includes the method of the thirty first aspect, further comprising determining a focusing position of the defect forming laser beam based on at least one of the generated intensity profiles, the image, and the comparison of the image and the intensity profile.

A thirty third aspect of the present disclosure includes the method of the thirty first aspect or the thirty second aspects, further comprising determining a time dependency of an energy of the defect forming laser beam based on the intensity profiles.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 8B depicts a chart of intensity profiles of images of the defect shown in FIG. 8A obtained from the inspection system, according to one or more embodiments described herein;

DETAILED DESCRIPTION

Figure 1A:
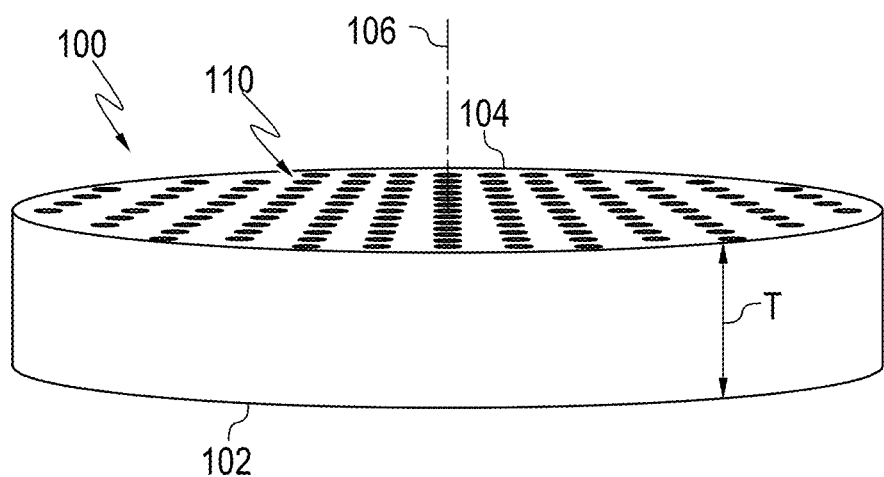
FIG. 1A depicts a perspective view of a transparent workpiece having a plurality of vias formed therein, according to one or more embodiments described herein.

Reference will now be made in detail to embodiments of inspecting defects formed in a transparent workpiece via laser processing. The defects may be formed in the transparent workpiece as a part of a laser-damage-and-etch process for forming a through glass via ("TGV") that extends through the transparent workpiece or a blind via that extends only partially through the transparent workpiece. Whether the TGV is formed with a desired shape is dependent on a damage pattern of the defect because the damage pattern may impact the etching rates of the transparent workpiece. Accordingly, the methods herein include illuminating the defects with light from an illumination source. The method also includes detecting an image signal of light scattered from the defects using an imaging system. The imaging system may have an imaging axis that may be disposed at an angle from a direction of extension of the defects. Entireties of the defects may be within a depth of field of the imaging system such that a plurality of the defects may be imaged simultaneously by the imaging system.

More particularly, the methods described herein include capturing a dark field scattering image signal of light scattering from the defects. Intensity profiles for each defect may be generated based on the dark field scattering image signal and various characteristics of the defects may be determined from the intensity profiles. Such characteristics may have a direct relationship with, for example, TGVs that may be formed from the damage tracks as a result of chemical etching. Given this, the methods described herein provide a non-invasive way to characterize the defects prior to application of the etchant. Beneficially, the imaging system may be integrated into existing laser processing systems used to form the defects. Moreover, the non-destructive nature of the methods described herein renders them usable for feedback control of the laser processing system such that damage tracks possessing desired characteristic may be produced.

As used herein, the term "dark field scattering image signal" refers to an image signal of light scattered from a target portion of an imaged object (e.g., a plurality of defects formed in a transparent workpiece) that excludes un-scattered portions of light used to illuminate the imaged object. The term "scattering image signal" refers to light that may include such un-scattered portions of the light used to illuminate the imaged object.

As used herein, "laser processing" comprises directing a laser beam onto and/or into a substrate, such as a transparent workpiece. In some embodiments, laser processing further comprises translating the laser beam relative to the transparent workpiece, for example, along a contour line or other pathway. Examples of laser processing include using a laser beam to form a contour comprising a series of defects that extend into the transparent workpiece and using a pulsed laser beam.

As used herein, "upstream" and "downstream" refer to the relative position of two locations or components along a beam pathway with respect to a beam source. For example, a first component is upstream from a second component if the first component is closer to the beam source along the path traversed by the laser beam than the second component.

As used herein, "pulsed laser beam focal line," refers to a pattern of interacting (e.g., crossing) light rays of a pulsed laser beam that forms a focal region elongated in the beam propagation direction. In conventional laser processing, a pulsed laser beam is tightly focused to a focal point. The focal point is the point of maximum intensity of the pulsed laser beam and is situated at a focal plane in a substrate, such as the transparent workpiece. In the elongated focal region of a pulsed laser beam focal line, in contrast, the region of maximum intensity of the pulsed laser beam extends beyond a point to a line aligned with the beam propagation direction. A pulsed laser beam focal line is formed by converging light rays of a pulsed laser beam that intersect (e.g., cross) to form a continuous series of focal points aligned with the beam propagation direction. The pulsed laser beam focal lines described herein are formed using a quasi-non-diffracting beam, mathematically defined in detail below.

As used herein, "contour line," corresponds to the set of intersection points of the laser beam with the incident surface of a substrate (e.g., the transparent workpiece) resulting from relative motion of the laser beam and the substrate. A contour line can be a linear, angled, polygonal or curved in shape. A contour line can be closed (i.e., defining an enclosed region on the surface of the substrate) or open (i.e., not defining an enclosed region on the surface of the substrate). The contour line represents a boundary along which separation of the substrate into two or more parts is facilitated.

As used herein, "contour," refers to a set of defects in a transparent workpiece formed by a laser beam through relative motion of a laser beam and the substrate along a contour line. The defects are spaced apart along the contour line and are wholly contained within the interior of the substrate or extend through one or more surfaces into the interior of the substrate. Defects may also extend through the entire thickness of the substrate.

As used herein, a "defect" refers to a region of a transparent workpiece that has been modified by a laser beam. Defects include regions of a transparent workpiece having a modified refractive index relative to surrounding unmodified regions of the transparent workpiece. Common defects include structurally modified regions such as void spaces, cracks, scratches, flaws, holes, perforations, densifications, or other deformities in the transparent workpiece produced by a pulsed laser beam focal line. Defects may also be referred to, in various embodiments herein, as defect lines or damage tracks. A defect or damage track is formed through interaction of a laser beam with the transparent workpiece. As described more fully below, the defects or damage track may be produced through interaction of a pulsed laser beam focal line with the transparent workpiece. In various embodiments, the pulsed laser beam focal line is produced by a pulsed laser. A defect at a particular location along the contour line is formed from a pulsed laser beam focal line produced by a single laser pulse at the particular location, a pulse burst of sub-pulses at the particular location, or multiple laser pulses at the particular location. Relative motion of the laser beam and transparent workpiece along the contour line results in multiple defects that form a contour.

The phrase "transparent workpiece," as used herein, means a workpiece formed from glass, glass-ceramic or other material which is transparent, where the term "transparent," as used herein, means that the material has a linear optical absorption of less than 20% per mm of material depth, such as less than 10% per mm of material depth for the specified pulsed laser wavelength, or such as less than 1% per mm of material depth for the specified pulsed laser wavelength. Unless otherwise specified, the material has a linear optical absorption of less than about 20% per mm of material depth. The transparent workpiece may have a depth (e.g., thickness) of from about 50 microns (μm) to about 10 mm (such as from about 100 μm to about 5 mm, or from about 0.5 mm to about 3 mm). Transparent workpieces may comprise glass workpieces formed from glass compositions, such as borosilicate glass, soda-lime glass, aluminosilicate glass, alkali aluminosilicate, alkaline earth aluminosilicate glass, alkaline earth boro-aluminosilicate glass, fused silica, or crystalline materials such as sapphire, silicon, gallium arsenide, or combinations thereof. In some embodiments, the transparent workpiece may be strengthened by thermal tempering before or after laser processing the transparent workpiece. In some embodiments, the glass may be ion-exchangeable, such that the glass composition can undergo ion-exchange for glass strengthening before or after laser processing the transparent workpiece. For example, the transparent workpiece may comprise ion exchanged and ion exchangeable glass, such as Corning Gorilla® Glass available from Corning Incorporated of Corning, NY (e.g., code 2318, code 2319, and code 2320). Further, these ion-exchanged glasses may have coefficients of thermal expansion (CTE) of from about 6 ppm/° C. to about 10 ppm/° C. Other example transparent workpieces may comprise EAGLE XG® and CORNING LOTUS™ available from Corning Incorporated of Corning, NY. Moreover, the transparent workpiece may comprise other components, which are transparent to the wavelength of the laser, for example, glass ceramics or crystals such as sapphire or zinc selenide. Furthermore, in the embodiments described herein, a coating layer is disposed on the transparent workpiece forming a coated substrate.

In an ion exchange process, ions in a surface layer of the transparent workpiece are replaced by larger ions having the same valence or oxidation state, for example, by partially or fully submerging the transparent workpiece in an ion exchange bath. Replacing smaller ions with larger ions causes a layer of compressive stress to extend from one or more surfaces of the transparent workpiece to a certain depth within the transparent workpiece, referred to as the depth of layer. The compressive stresses are balanced by a layer of tensile stresses (referred to as central tension) such that the net stress in the glass sheet is zero. The formation of compressive stresses at the surface of the glass sheet makes the glass strong and resistant to mechanical damage and, as such, mitigates catastrophic failure of the glass sheet for flaws, which do not extend through the depth of layer. In some embodiments, smaller sodium ions in the surface layer of the transparent workpiece are exchanged with larger potassium ions. In some embodiments, the ions in the surface layer and the larger ions are monovalent alkali metal cations, such as Li+ (when present in the glass), Na+, K+, Rb+, and Cs+. Alternatively, monovalent cations in the surface layer may be replaced with monovalent cations other than alkali metal cations, such as Ag+, Tl+, Cu+, or the like.

As used herein, the term "quasi-non-diffracting beam" is used to describe a laser beam having low beam divergence as mathematically described below. In particular, the laser beam used to form a contour of defects in the embodiments described herein. The laser beam has an intensity distribution $I(X,Y,Z)$, where Z is the beam propagation direction of the laser beam, and X and Y are directions orthogonal to the beam propagation direction, as depicted in the figures. The X-direction and Y-direction may also be referred to as cross-sectional directions and the X-Y plane may be referred to as a cross-sectional plane. The coordinates and directions X, Y, and Z are also referred to herein as X, Y, and Z; respectively. The intensity distribution of the laser beam in a cross-sectional plane may be referred to as a cross-sectional intensity distribution.

The quasi-non-diffracting laser beam may be formed by impinging a diffracting laser beam (such as a Gaussian beam) into, onto, and/or thorough a phase-altering optical element, such as an adaptive phase-altering optical element (e.g., a spatial light modulator, an adaptive phase plate, a deformable mirror, or the like), a static phase-altering optical element (e.g., a static phase plate, an aspheric optical element, such as an axicon, or the like), to modify the phase of the beam, to reduce beam divergence, and to increase Rayleigh range, as mathematically defined below. Example quasi-non-diffracting beams include Gauss-Bessel beams, Airy beams, Weber beams, and Bessel beams.

Figure 1B:
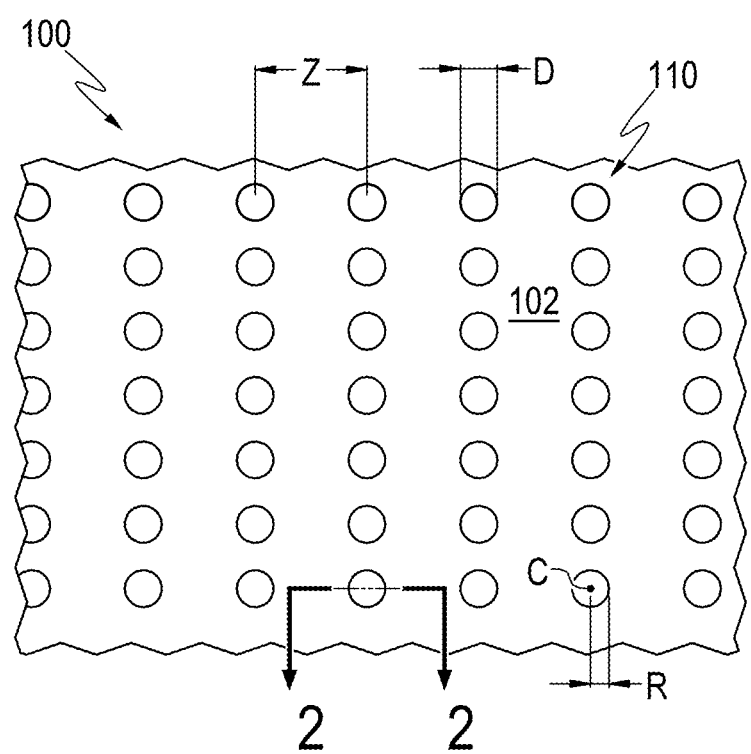
FIG. 1B depicts a partial plan view of a transparent workpiece having a plurality of vias formed therein, according to one or more embodiments described herein.

FIG. 1A schematically illustrates a perspective view of an exemplary transparent workpiece 100 having a plurality of vias 110 disposed therein. FIG. 1B schematically depicts a partial plan view of the example transparent workpiece 100 depicted in FIG. 1A. Although FIGS. 1A and 1B depict the transparent workpiece 100 configured as a wafer, it should be understood that the article may take on any shape, such as, without limitation, a panel. The transparent workpiece 100 may be generally planar and may have a first surface 102 and a second surface 104 positioned opposite to and planar with the first surface 102. A surface normal 106 of the first surface 102 extends parallel to the vias 110 in the shown embodiment, but it should be appreciated that vias 110 may extend at an angle to the surface normal 106 in other embodiments.

In some embodiments, the transparent workpiece 100 may be implemented as an interposer in an electronic device to pass electrical signals through transparent workpiece 100, for example, but not limited to, between one or more electronic components coupled to a first surface 102 and one or more electronic components coupled to a second surface 104 of the transparent workpiece 100. In such embodiments, the vias 110 of the transparent workpiece 100 are filled with an electrically conductive material to provide electrically conductive vias through which electrical signals may pass. The vias 110 may be through-glass-vias or blind vias, for example. As used herein, a through-glass-via extends through a thickness T of the transparent workpiece 100 from the first surface 102 to the second surface 104. As used herein, a blind via extends only partially through the thickness T of the transparent workpiece 100 from one of the first surface 102 or the second surface 104 but not all the way to the other of the first surface 102 or the second surface 104. Other features may be formed within the first surface 102 or the second surface 104 of the transparent workpiece 100, such as, without limitation, channels that may be metalized to provide one or more patterns of electrical traces. Other features may also be provided.

The transparent workpiece 100 has any size and/or shape, which may, for example, depend on the end application. As an example and not a limitation, the thickness T of the transparent workpiece 100 may be within a range of about 25 microns to about 3,000 microns, including about 25 microns, about 50 microns, about 75 microns, about 100 microns, about 200 microns, about 300 microns, about 400 microns, about 500 microns, about 600 microns, about 700 microns, about 800 microns, about 900 microns, about 1,000 microns, about 2,000 microns, about 3,000 microns, or any value or range between any two of these values (including endpoints).

The vias 110 of the transparent workpiece 100 may have an opening diameter D, for example, of about 5 microns to about 250 microns, including about 10 microns or less, about 15 microns or less, about 20 microns or less, about 25 microns or less, about 30 microns or less, 35 microns or less, about 40 microns or less, about 50 microns or less, about 60 microns or less, about 70 microns or less, about 80 microns or less, about 90 microns or less, about 100 microns or less, about 110 microns or less, about 120 microns or less, about 130 microns or less, about 140 microns or less, about 150 microns or less, about 160 microns or less, about 170 microns or less, about 180 microns or less, about 190 microns or less, about 200 microns or less, about 210 microns or less, about 220 microns or less, about 230 microns or less, about 240 microns or less, about 250 microns or less, or any value or range between any two of these values (including endpoints). As used herein, the opening diameter D refers to a diameter of the opening of the via 110 at the first surface 102 or at the second surface 104 of the transparent workpiece 100. The opening of the via 110 is generally at a location that marks a transition between first surface 102 or the second surface 104 and a sloped surface of a wall of the via 110. The opening diameter D of the vias 110 may be determined by finding a diameter of a least-squares best fit circle to the edges of the entrance to the vias 110 as imaged by an optical microscope.

Similarly, the vias 110 of the transparent workpiece 100 may have an opening radius R of about 5 microns to about 150 microns. As used herein, the opening radius R refers to the radius from a center point C of the opening of the via 110 at the first surface 102 or at the second surface 104 of the transparent workpiece 100.

A pitch Z of the vias 110, which is the center-to-center spacing between adjacent vias 110, may be any dimension according to the desired application, such as, without limitation, about 10 microns to about 2,000 microns, including about 10 microns, about 50 microns, about 100 microns, about 250 microns, about 1,000 microns, about 2,000 microns, or any value or range between any two of these values (including endpoints). In some embodiments, the pitch Z may vary between vias 110 on the same transparent workpiece 100 (i.e., the pitch Z between a first via and a second via may be different from a pitch Z between the first via and a third via). In some embodiments, the pitch Z may be a range, such as about 10 microns to about 100 microns, about 25 microns to about 500 microns, about 10 microns to about 1,000 microns, or about 250 microns to about 2,000 microns.

As noted hereinabove, the vias 110 (and other features in some embodiments) may be filled with an electrically con-ductive material using any known technique including, but not limited to, sputtering, electroless and/or electrolytic plating, chemical vapor deposition, and/or the like. The electrically conductive material may be, for example, copper, silver, aluminum, titanium, gold, platinum, nickel, tungsten, magnesium, or any other suitable material. When the vias 110 are filled, they may electrically couple electrical traces of electrical components disposed on the first surface 102 and the second surface 104 of the transparent workpiece 100.

The geometry of the vias 110 may play a role in the quality of the resulting filling of the vias 110. The interior shape (i.e., profile) of the vias 110 may play significant roles in the success of the metallization process. For example, vias that are too "hourglass" in shape can lead to poor metallization and inadequate electrical performance after metallization. Metallization processes, such as vacuum deposited coatings, often have line-of-sight issues, meaning that applied coatings cannot reach the innermost areas of rough texture, or the lower region of an hourglass shaped via, because some points in the surface "shadow" others from the coating process. The same hourglass shapes can also lead to reliability issues post metallization, such as where cracking and other failures can occur when the part is subjected to environmental stress such as thermal cycling. Additionally, along the top and bottom surface of the article, depressions or mounds near the entrance and/or exit of the vias 110 can also lead to plating, coating, and bonding issues when redistribution layer processes are applied. Accordingly, tight control of the morphology of the holes should be present to fabricate a technically viable product.

While specific reference has been made herein to vias 110 with different cross-sectional geometries through the thickness of the transparent workpiece 100, it should be understood that the vias 110 may include a variety of other cross-sectional geometries and, as such, the embodiments described herein are not limited to any particular cross-sectional geometry of the vias 110. Moreover, while the vias 110 are depicted as having a circular cross section in the plane of the transparent workpiece 100, it should be understood that the vias 110 may have other planar cross-sectional geometries. For example, the vias 110 may have various other cross sectional geometries in the plane of the transparent workpiece 100, including, without limitation, elliptical cross sections, square cross sections, rectangular cross sections, triangular cross sections, and the like. Further, it should be understood that vias 110 with different cross sectional geometries may be formed in a single interposer panel.

The vias 110 may be formed by a laser-damage-and-etch process. In this process, a defect is initially formed in the glass substrate by using a laser to modify the transparent workpiece 100 along the defect. An etching solution is then applied to the transparent workpiece 100. The transparent workpiece 100 is thinned by the etching solution. Because the etching rate of the transparent workpiece 100 is faster at the defect, the defect is preferentially etched so that a via 110 is opened through the transparent workpiece 100. The amount that the transparent workpiece 100 is damaged at a particular point along the damage track may determine the ultimate profile of the vias 110 formed in the transparent workpiece 100.

Figure 2B:
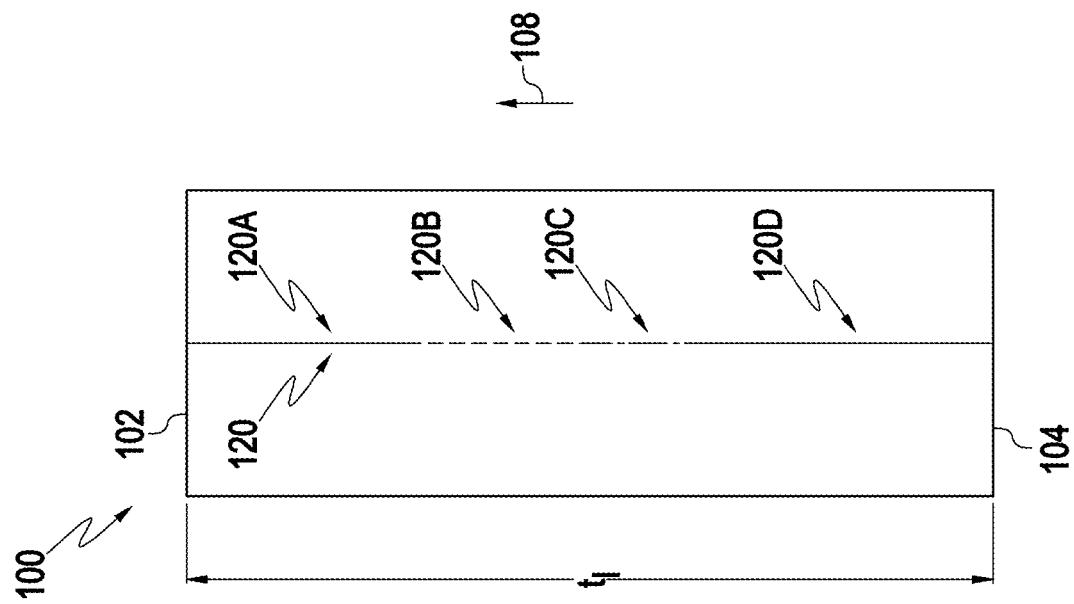
FIG. 2B schematically depicts a defect formed in a transparent workpiece having a non-uniform damage profile as a function of depth, according to one or more embodiments described herein.
Figure 2A:
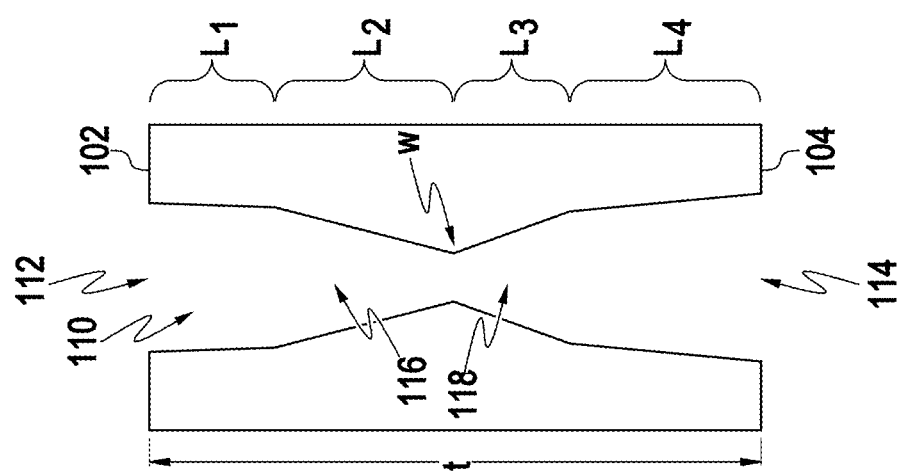
FIG. 2A depicts a cross-sectional view of a via formed in a transparent workpiece, according to one or more embodiments described herein.

Referring now to FIG. 2A, a cross-sectional profile of one of the vias 110 is shown (e.g., prior to the vias 110 being filled with electrically-conductive material). The shown via 110 possesses an hourglass-shaped profile including first and second portions 112 and 114 extending from the first and second surfaces 102 and 104 and possessing lengths $L_1$ and $L_4$, respectively. A third portion 116 extends from the first portion 112 to a waste w of the via 110 and has a length $L_2$. A fourth portion 118 extends from the second portion 114 to the waste w of the via 110 and has a length $L_3$. Generally, the via 110 possess the greatest cross-sectional area in the first and second portions 112 and 114.

To form a via profile such as the one shown in FIG. 2A through the laser-damage-and-etch process described herein, a defect may be formed in the transparent workpiece 100 that possesses a non-uniform damage distribution as a function of depth within the transparent workpiece 100. FIG. 2B schematically depicts such a non-uniform defect 120 in the transparent workpiece 100. The defect 120 includes four segments each having a different level of modification and therefore different etching properties: a first modified segment 120A, a second modified segment 120B, a third modified segment 120C, and a fourth modified segment 120D. It should be understood that the level of modification between the various segments may not be discrete, but may also may gradually vary along defect 120. Thus, the level of modification may vary within the individual segments of the defect 120. Additionally, it should be understood that the defect 120 may possess any number of such segments consistent with the embodiments described herein.

In some embodiments, the defect 120 is configured such that the highest level of modification occurs proximate the first surface 102 and the second surface 104 of the transparent workpiece. In such embodiments, the first modified segment 120A and the fourth modified segment 120D are highly modified segments. The second modified segment 120B and the third modified segment 120C are minimally modified segments in that they have a level of modification that is less than that of the first segment 120A and the fourth segment 120D. Although the second segment 120B and the third segment 120C are illustrated as individual segments, in some embodiments, the second segment 120B and the third segment 120C are a single, minimally modified segment having a level of modification that is less than the level of modification of first modified segment 120A and fourth modified segment 120D. Such defects 120 having non-uniform damage profiles may be generated by providing a defect forming laser beam into the transparent workpiece 100. A laser defect 120 such as the one depicted in FIG. 2B may be formed by exposing the transparent workpiece 100 to a pulsed laser beam.

Figure 3A:
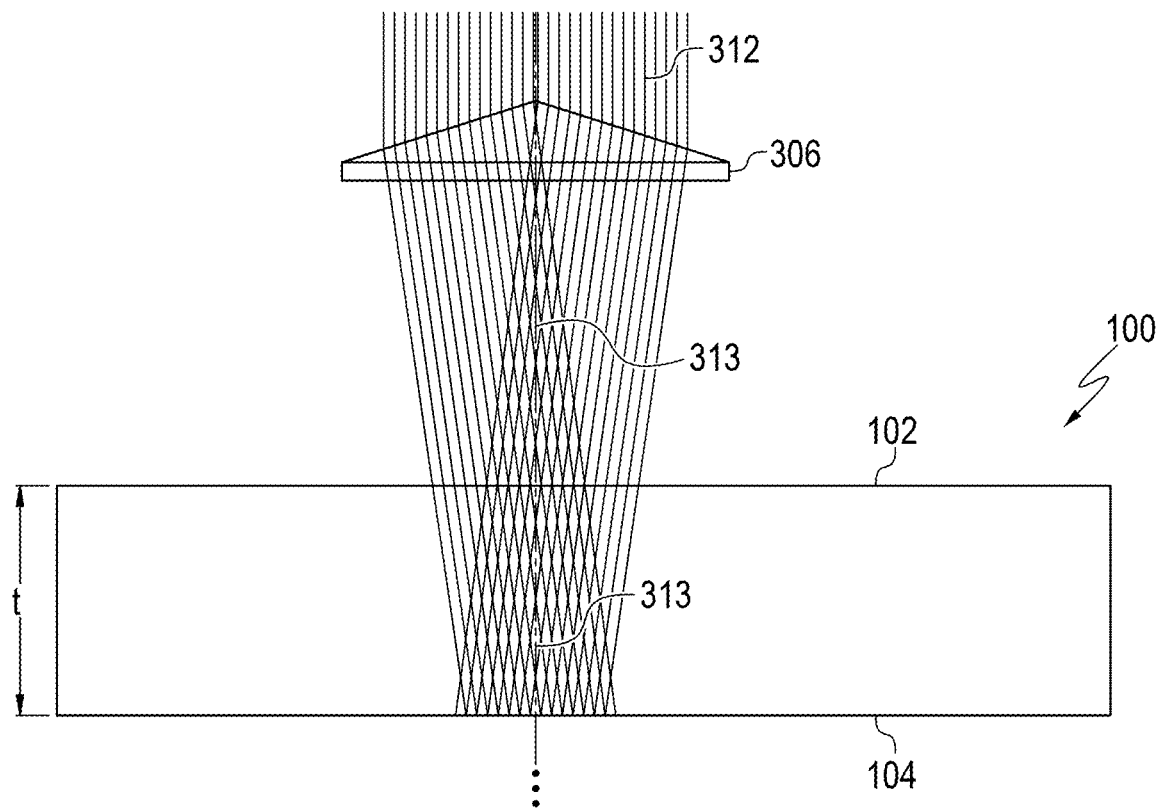
FIG. 3A schematically depicts the formation of a defect in a transparent workpiece by a laser beam focal line, according to one or more embodiments described herein.

Referring to FIG. 3A, in some embodiments, the defect 120 is formed by a pulsed laser beam 312 that is focused into a pulsed laser beam focal line 313 that is positioned through the bulk of the transparent workpiece 100. The pulsed laser beam focal line 313 generates an induced multi-photon absorption within the transparent workpiece 100. The multi-photon induced absorption produces a material modification within the transparent workpiece along the pulsed laser beam focal line 313, thereby forming the defect 120. The pulsed laser beam focal line 313 is created by optics 306, which as a non-limiting example depicted in 3A, is an aspheric optical element (e.g., an axicon). Additional description of methods for generating and using a laser beam focal line for drilling glass substrates is provided in U.S. Pat. No. 9,517,963, which is incorporated by reference herein in its entirety.

The optics 306 form the laser beam into an extended focus, or quasi-non-diffracting beam resulting in a Bessel-like or Gauss-Bessel beam. Because of the quasi-non-diffracting nature of the beam, the light maintains a tight focused intensity over a much longer range than is achieved with more commonly used Gaussian beams, allowing the full thickness t of the glass substrate to be damaged by a single burst pulse or a closely timed burst train of laser pulses.

The defects formed by such a quasi-non-diffracting beam are generally small diameter, such as <5 μm in diameter, or even <2.5 μm in diameter, or even as low as 1 μm in diameter, where the diameter of the defect is defined as the size of the region over which the refractive index of the glass has been modified enough that it appears as a lighter or darker area compared to the surrounding glass, when viewed with an optical microscope. The defects are extended linear features, and can extend entirely from one surface of the glass sheet to the other, such as through a thickness of glass that is 100-1000 um thick. In embodiments, the aspect ratio (e.g., length/diameter) of the defects is greater than or equal 20:1. It should be appreciated that the aspect ratio of the defects can also be as high as 1000:1. In an example, a 300 μm thick substrate included 1-2.5 μm diameter defects, and the aspect ratio is greater than or equal to 120:1 and less than or equal to 300:1.

The length of the pulsed laser beam focal line 313 produced from a quasi-non-diffracting beam is determined by the Rayleigh range of the quasi-non-diffracting beam. Particularly, the quasi-non-diffracting beam defines a pulsed laser beam focal line 313 having a first end point and a second end point each defined by locations where the quasi-non-diffracting beam has propagated a distance from the beam waist equal to a Rayleigh range of the quasi-non-diffracting beam. The length of the laser beam focal corresponds to twice the Rayleigh range of the quasi-non-diffracting beam. A detailed description of the formation of quasi-non-diffracting beams and determining their length, including a generalization of the description of such beams to asymmetric (such as non-axisymmetric) beam cross sectional profiles, is provided in U.S. Published Patent Application No. 62/402,337 20180093914, which is incorporated by reference in its entirety.

The Rayleigh range corresponds to the distance (relative to the position of the beam waist as defined in Section 3.12 of ISO 11146-1:2005(E)) over which the variance of the laser beam doubles (relative to the variance at the position of the beam waist) and is a measure of the divergence of the cross sectional area of the laser beam. The Rayleigh range can also be observed as the distance along the beam axis at which the peak optical intensity observed in a cross sectional profile of the beam decays to one half of its value observed in a cross sectional profile of the beam at the beam waist location (location of maximum intensity). Laser beams with large Rayleigh ranges have low divergence and expand more slowly with distance in the beam propagation direction than laser beams with small Rayleigh ranges.

Beam cross section is characterized by shape and dimensions. The dimensions of the beam cross section are characterized by a spot size of the beam. For a Gaussian beam, spot size is frequently defined as the radial extent at which the intensity of the beam decreases to $1/e^2$ of its maximum value. The maximum intensity of a Gaussian beam occurs at the center (x=0 and y=0 (Cartesian) or r=0 (cylindrical)) of the intensity distribution and radial extent used to determine spot size is measured relative to the center.

Beams with Gaussian intensity profiles may be less preferred for laser processing to form a contour of defects because, when focused to small enough spot sizes (such as spot sizes in the range of microns, such as about 1-5 μm or about 1-10 μm) to enable available laser pulse energies to modify materials such as glass, they are highly diffracting and diverge significantly over short propagation distances (low Rayleigh range). To achieve low divergence (high Rayleigh range), it is desirable to control or optimize the intensity distribution of the pulsed laser beam to reduce diffraction. Pulsed laser beams may be non-diffracting or weakly diffracting. Weakly diffracting laser beams include quasi-non-diffracting laser beams. Representative weakly diffracting laser beams include Bessel beams, Gauss-Bessel beams, Airy beams, Weber beams, and Mathieu beams.

Non-diffracting or quasi-non-diffracting beams generally have complicated intensity profiles, such as those that decrease non-monotonically vs. radius. By analogy to a Gaussian beam, an effective spot size $w_{o,eff}$ can be defined for any beam, even non-axisymmetric beams, as the shortest radial distance, in any direction, from the radial position of the maximum intensity (r=0) at which the intensity decreases to $1/e^2$ of the maximum intensity. Further, for axisymmetric beams $w_{o,eff}$ is the radial distance from the radial position of the maximum intensity (r=0) at which the intensity decreases to $1/e^2$ of the maximum intensity. A criterion for Rayleigh range $Z_R$ based on the effective spot size $w_{o,eff}$ for axisymmetric beams can be specified as non-diffracting or quasi-non-diffracting beams for forming damage regions in Equation (1), below:

$$Z_R > F_D \frac{\pi w_{0,eff}^2}{\lambda} \quad (1)$$

where $F_D$ is a dimensionless divergence factor having a value of at least 10, at least 50, at least 100, at least 250, at least 500, at least 1000, in the range from 10 to 2000, in the range from 50 to 1500, in the range from 100 to 1000. For a non-diffracting or quasi-non-diffracting beam the distance (Rayleigh range), $Z_R$ in Equation (1), over which the effective spot size doubles, is $F_D$ times the distance expected if a typical Gaussian beam profile were used. The dimensionless divergence factor $F_D$ provides a criterion for determining whether or not a laser beam is quasi-non-diffracting. As used herein, the pulsed laser beam 312 is considered quasi-non-diffracting if the characteristics of the laser beam satisfy Equation (1) with a value of $F_D \geq 10$. As the value of $F_D$ increases, the pulsed laser beam 312 approaches a more nearly perfectly non-diffracting state.

Additional information about Rayleigh range, beam divergence, intensity distribution, axisymmetric and non-axisymmetric beams, and spot size as used herein can also be found in the international standards ISO 11146-1:2005(E) entitled "Lasers and laser-related equipment-Test methods for laser beam widths, divergence angles and beam propagation ratios-Part 1: Stigmatic and simple astigmatic beams", ISO 11146-2:2005(E) entitled "Lasers and laser-related equipment Test methods for laser beam widths, divergence angles and beam propagation ratios-Part 2: General astigmatic beams", and ISO 11146-3:2004(E) entitled "Lasers and laser-related equipment Test methods for laser beam widths, divergence angles and beam propagation ratios-Part 3: Intrinsic and geometrical laser beam classification, propagation and details of test methods", the disclosures of which are incorporated herein by reference in their entirety.

Figure 3B:
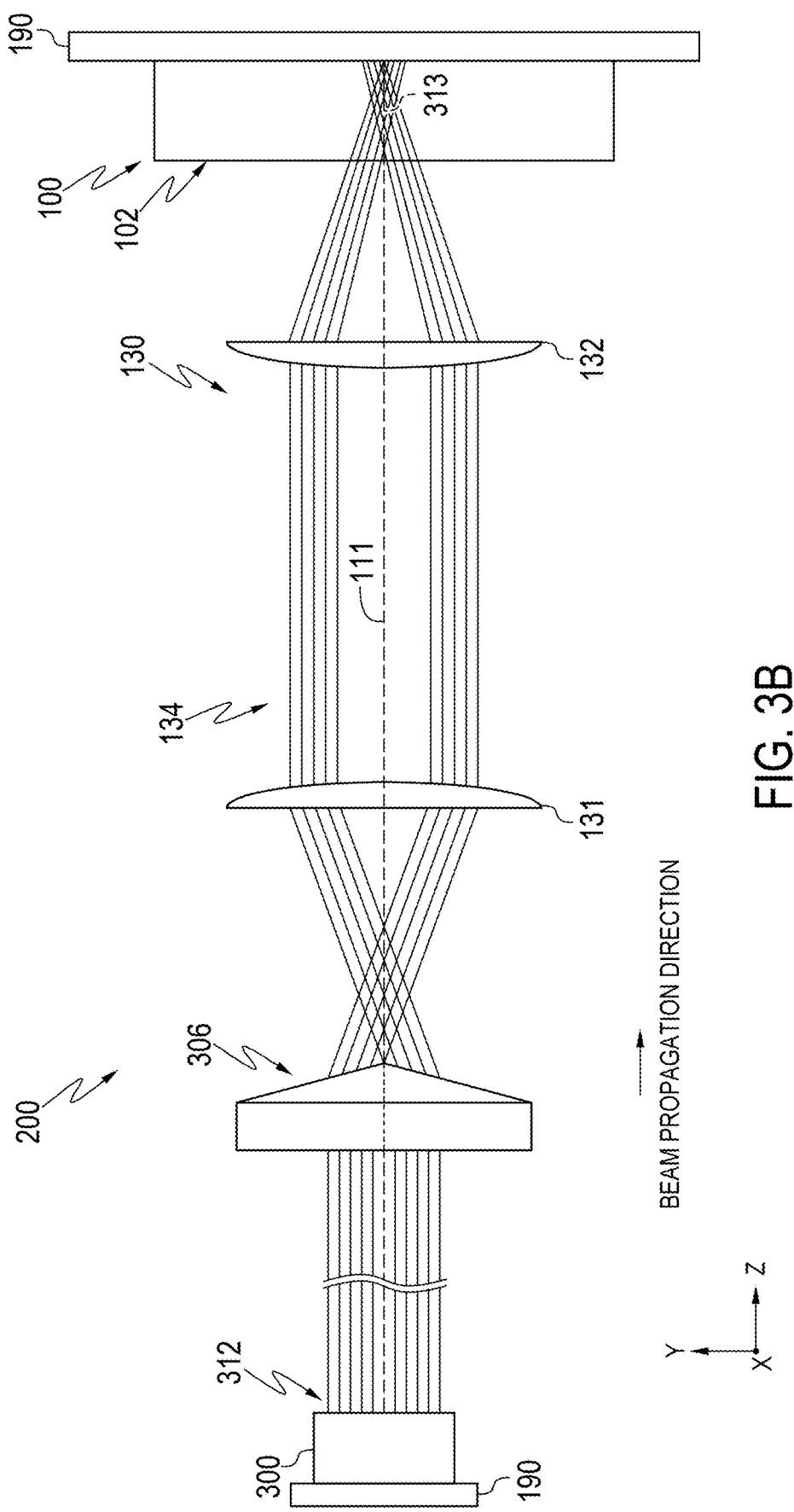
FIG. 3B schematically depicts a defect forming optical system for directed a pulsed laser beam into a transparent workpiece, according to one or more embodiments described herein.

Referring now to FIG. 3B, a defect forming optical system 200 for producing a pulsed laser beam 312 that is quasi-non-diffracting and forms the pulsed laser beam focal line 313 at the transparent workpiece 100 using the aspheric optical element 306 (e.g., an axicon) is schematically depicted. The defect forming optical system 200 includes a pulsed laser beam source 300 that outputs the pulsed laser beam 312, and a lens assembly 130 comprising the first lens 131 and the second lens 132. The transparent workpiece 100 may be positioned such that the pulsed laser beam 312 output by the pulsed laser beam source 300 irradiates the transparent workpiece 100, for example, after traversing the aspheric optical element 306 and thereafter, both the first lens 131 and the second lens 132.

The aspheric optical element 306 is positioned within the beam pathway 111 between the pulsed laser beam source 300 and the transparent workpiece 100. In operation, propagating the pulsed laser beam 312, e.g., an incoming Gaussian beam, through the aspheric optical element 306 may alter, for example, phase alter, the pulsed laser beam 312 such that the portion of the pulsed laser beam 312 propagating beyond the aspheric optical element 306 is quasi-non-diffracting, as described above. The aspheric optical element 306 may comprise any optical element comprising an aspherical shape. In some embodiments, the aspheric optical element 306 may comprise a conical wavefront producing optical element, such as an axicon lens, for example, a negative refractive axicon lens (e.g., negative axicon), a positive refractive axicon lens, a reflective axicon lens, a diffractive axicon lens, a phase axicon, a diffractive optic, an optical element having a curvature such that the optical element imparts a cubic phase term on a wavefront of the pulsed laser beam 312 (e.g., to generate an Airy beam), or the like.

While the defect forming optical system 200 is primarily described as altering the pulsed laser beam 312 into a quasi-non-diffracting beam using the aspheric optical element 306, it should be understood that a quasi-non-diffracting beam also be formed by other phase-altering optical elements, such as a spatial light modulator, an adaptive phase plate, a static phase plate, a deformable mirror, diffractive optical grating, or the like. Each of these phase-altering optical elements, including the aspheric optical element 306, modify the phase of the pulsed laser beam 312, to reduce beam divergence, increase Rayleigh range, and form a quasi-non-diffracting beam as mathematically defined above.

Referring still to FIG. 3B, the lens assembly 130 comprises two sets of lenses, each set comprising the first lens 131 positioned upstream the second lens 132. The first lens 131 may collimate the pulsed laser beam 312 within a collimation space 134 between the first lens 131 and the second lens 132 and the second lens 132 may focus the pulsed laser beam 312. Further, the most downstream positioned second lens 132 of the lens assembly 130 may focus the pulsed laser beam 312 into the transparent workpiece 100. In some embodiments, the first lens 131 and the second lens 132 each comprise plano-convex lenses. When the first lens 131 and the second lens 132 each comprise plano-convex lenses, the curvature of the first lens 131 and the second lens 132 may each be oriented toward the collimation space 134. In other embodiments, the first lens 131 may comprise other collimating lenses and the second lens 132 may comprise a meniscus lens, an asphere, or another higher-order corrected focusing lens. In operation, the lens assembly 130 may control the position of the pulsed laser beam focal line 113 along the beam pathway 111. Further, the lens assembly 130 may comprise an 8F lens assembly, a 4F lens assembly comprising a single set of first and second lenses 131, 132, or any other known or yet to be developed lens assembly 130 for focusing the pulsed laser beam 312 into the pulsed laser beam focal line 113. Moreover, it should be understood that some embodiments may not include the lens assembly 130 and instead, the aspheric optical element 306 may focus the pulsed laser beam 312 into the pulsed laser beam focal line 113.

The pulsed laser beam source 300 is configured to output pulsed laser beams 312. In some embodiments, the pulsed laser beam source 300 may output a pulsed laser beam 312 comprising a wavelength of, for example, 1064 nm, 1030 nm, 532 nm, 530 nm, 355 nm, 343 nm, or 266 nm, or 215 nm. Further, the pulsed laser beam 312 used to form defects 120 in the transparent workpiece 100 may be well suited for materials that are transparent to the selected pulsed laser wavelength. Suitable laser wavelengths for forming defects 120 are wavelengths at which the combined losses of linear absorption and scattering by the transparent workpiece 100 are sufficiently low. In embodiments, the combined losses due to linear absorption and scattering by the transparent workpiece 100 at the wavelength are less than 20%/mm, or less than 15%/mm, or less than 10%/mm, or less than 5%/mm, or less than 1%/mm, such as 0.5%/mm to 20%/mm, 1%/mm to 10%/mm, or 1%/mm to 5%/mm, for example, 1%/mm, 2.5%/mm, 5%/mm, 10%/mm, 15%/mm, or any range having any two of these values as endpoints, or any open-ended range having any of these values as a lower bound. As used herein, the dimension "/mm" means per millimeter of distance within the transparent workpiece 100 in the beam propagation direction of the pulsed laser beam 312 (i.e., the Z direction). Representative wavelengths for many glass workpieces include fundamental and harmonic wavelengths of $Nd^{3+}$ (e.g. $Nd^{3+}$:YAG or $Nd^{3+}$:$YVO_4$ having fundamental wavelength near 1064 nm and higher order harmonic wavelengths near 532 nm, 355 nm, and 266 nm). Other wavelengths in the ultraviolet, visible, and infrared portions of the spectrum that satisfy the combined linear absorption and scattering loss requirement for a given substrate material can also be used.

Directing or localizing the pulsed laser beam 312 into the transparent workpiece 100 generates an induced absorption (e.g., MPA) within the transparent workpiece 100 and deposits enough energy to break chemical bonds in the transparent workpiece 100 at spaced locations along a contour line to form the defects 120. According to one or more embodiments, the pulsed laser beam 312 may be translated across the transparent workpiece 100 by motion of the transparent workpiece 100 (e.g., motion of a translation stage 190 coupled to the transparent workpiece 100), motion of the pulsed laser beam 312 (e.g., motion of the pulsed laser beam focal line 313), or motion of both the transparent workpiece 100 and the pulsed laser beam focal line 313. By translating at least one of the pulsed laser beam focal line 113 relative to the transparent workpiece 100, the plurality of defects 120 may be formed in the transparent workpiece 100.

Figure 4:
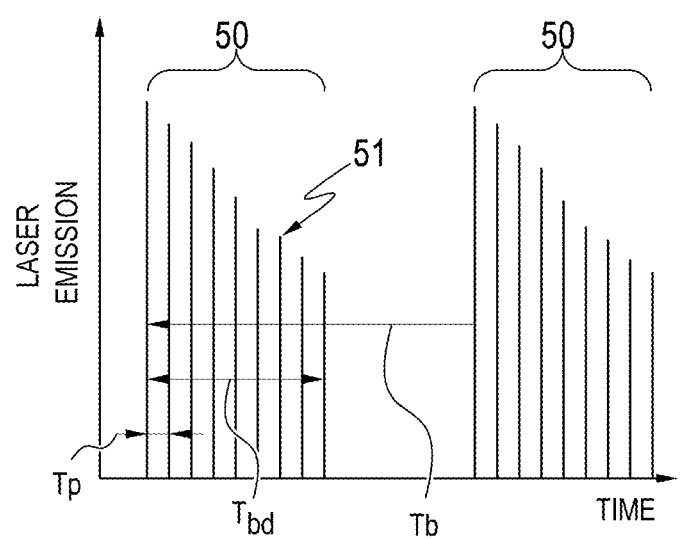
FIG. 4 schematically depicts the relative intensity of laser pulses within an example pulse burst vs. time, according to one or more embodiments described herein.

Referring now to FIG. 4, pulses produced by the pulsed laser beam source 300 are produced in pulse bursts 50 of two sub-pulses 51 or more per pulse burst 50, such as from 2 to 30 sub-pulses 51 per pulse burst 50 or from 5 to 20 sub-pulses 51 per pulse burst 50. Furthermore, the energy required to modify the transparent workpiece 100 is the pulse energy, which may be described in terms of pulse burst energy (i.e., the energy contained within a pulse burst 50 where each pulse burst 50 contains a series of sub-pulses 51; that is, the pulse burst energy is the combined energy of all sub-pulses within the pulse burst). The pulse energy (for example, pulse burst energy) may be from 25 µJ to 1000 µJ or 25 µJ to 750 µJ, such as from 100 µJ to 600 µJ, 50 µJ to 500 µJ, or from 50 µJ to 250 µJ, for example, 25 µJ, 50 µJ, 75 µJ, 100 µJ, 200 µJ, 250 µJ, 300 µJ, 400 µJ, 500 µJ, 600 µJ, 750 µJ, or any range having any two of these values as endpoints, or any open-ended range having any of these values as a lower bound.

It has been observed that too many sub-pulses results in a cylindrically shaped via. Particularly, a fifteen sub-pulse burst providing 80 µJ of energy produced a cylindrically shaped via, while a five sub-pulse burst providing 50 µJ produced an hourglass shaped via. The former has a lesser energy per sub-pulse, but will create a very uniform damage track through the thickness of the transparent workpiece, whereas the latter has a greater energy per sub-pulse but will create a more non-uniform damage track through the thickness of the transparent workpiece, with stronger damage being observed near the glass surfaces and weaker damage being observed near the middle of the transparent workpiece.

The pulsed laser beam focal line 313 typically has a uniform intensity. However, in the embodiments described herein, the amount of energy and the number of laser beam bursts are controlled to provide for non-uniform levels of modification along the desired defect 120. In other words, the damage pattern as a function of depth within the transparent workpiece 100 is not uniform. What is observed is that the amount of material modification near the surfaces of the transparent workpiece 100, in particular within 100 µm of each surface, is significantly different and stronger than the damage in the middle (center) of the transparent workpiece 100. As observed under a microscope with back-lighting, the regions near the surfaces of the transparent workpiece 100 typically appear very dark, indicating greater optical scattering and material modification, whereas the regions near the center of the transparent workpiece 100 appear as light colored or broken up dark regions, indicating less light scattering and hence weaker or less spatially consistent material modification. In addition, the regions near the surfaces of the transparent workpiece 100 will often exhibit actual holes, or regions where material has been ejected/ablated from the substrate, which can provide an easy path for chemical etchant to penetrate.

This effect of stronger damage near the surfaces is particularly evident as the laser energy of the pulsed laser beam focal line 313 is reduced to just above the threshold need to modify the transparent workpiece 100, such as within 60% above the threshold, within 65% above the threshold, within 55% above the threshold, within 50% above the threshold, within 45% above the threshold, within 40% above the threshold, within 35% above the threshold, within 30% above the threshold, within 25% above the threshold, within 20% above the threshold, within 15% above the threshold, or within 10% above the threshold. As used herein, the term "threshold" means a minimum energy needed to create surface damage on the substrate using a laser beam focal line. In such a situation, the regions closest to the surfaces will still exhibit dark damage regions, but the middle of the transparent workpiece will in some cases show no obvious damaged or modified regions at all. As described above, this differential damage effect as a function of depth observed with non-diffracting beams may be taken advantage of to form tapered vias in transparent workpiece where such vias shapes are not otherwise possible. As non-limiting examples, an operating range of the pulsed laser beam is within a range of 40 µJ to 55 µJ including endpoints, or within 45 µJ to 50 µJ including endpoints for five sub-pulses.

It is noted that it is not required to make the optical intensity of the quasi-non-diffracting beam (e.g., the pulsed laser beam focal line 313) stronger near the surfaces of the transparent workpiece 100. However, it is possible to design optics, such as custom axicon 306, which create custom optical energy distributions along the beam propagation direction. In such a case, the optical intensity of the pulsed laser beam focal line 313 may be enhanced near the fused substrate surfaces, while creating a lower intensity region in the middle of the transparent workpiece. Example optics for customizing the energy distribution of a laser beam focal line are described in U.S. Pat. No. 10,522,963; the disclosure of which is incorporated herein in its entirety.

Figure 5A:
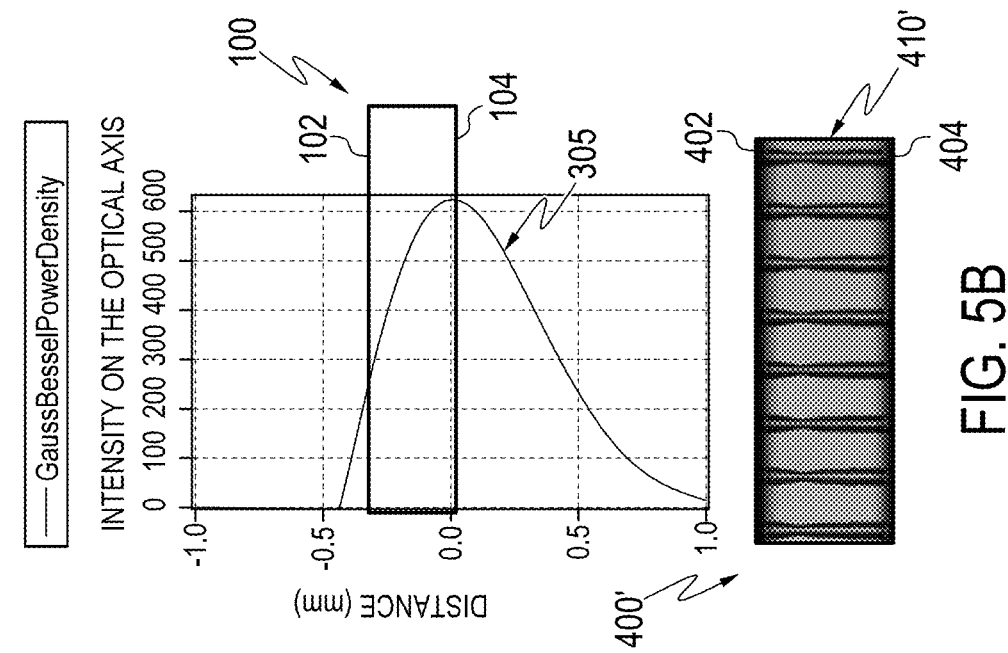
FIG. 5A depicts vias formed in a transparent workpiece as a result of a laser-damage-and-etch process when a focusing position of a pulsed laser beam is in a first position with respect to the transparent workpiece, according to one or more embodiments described herein.

It is possible to shift the location of the waist w of the via (see FIG. 2A) by altering the position of the maximum intensity of the laser beam focal line. FIG. 5A plots the intensity 305 of the pulsed laser beam focal line 313, and illustrates resulting vias 410 in an example transparent workpiece 400. As shown in FIG. 5A, positioning the maximum intensity 305 at the center of the transparent workpiece 100 results in vias 410 having a waist in the center of the transparent workpiece 400 after the etching process.

Figure 5B:
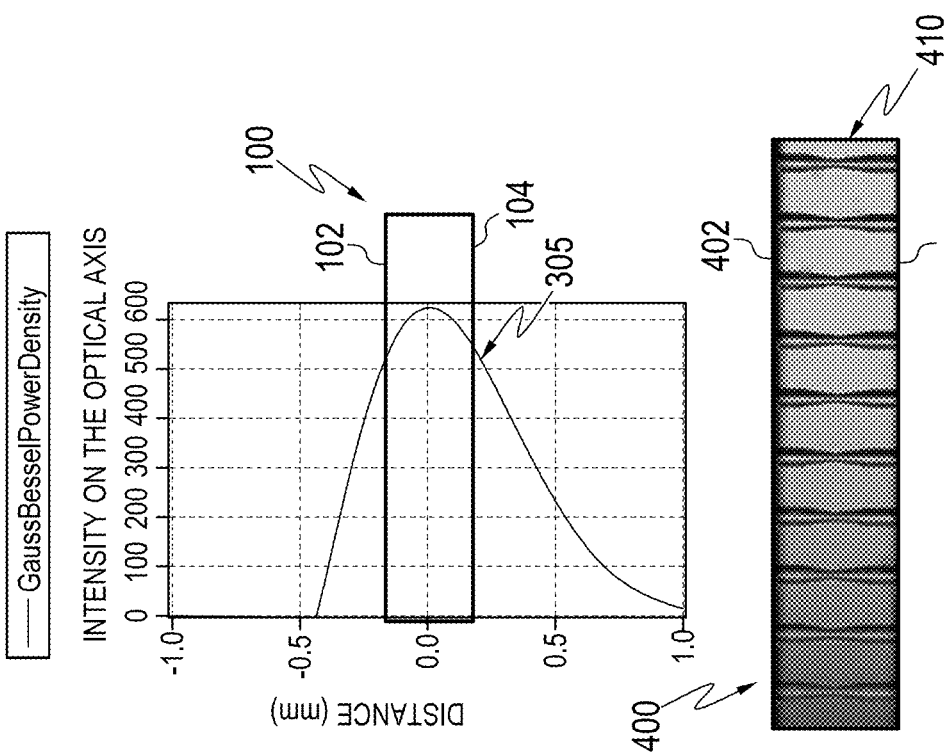
FIG. 5B depicts vias formed in a transparent workpiece as a result of a laser-damage-and-etch process when a focusing position of a pulsed laser beam is in a second position with respect to the transparent workpiece, according to one or more embodiments described herein.
Figure 5C:
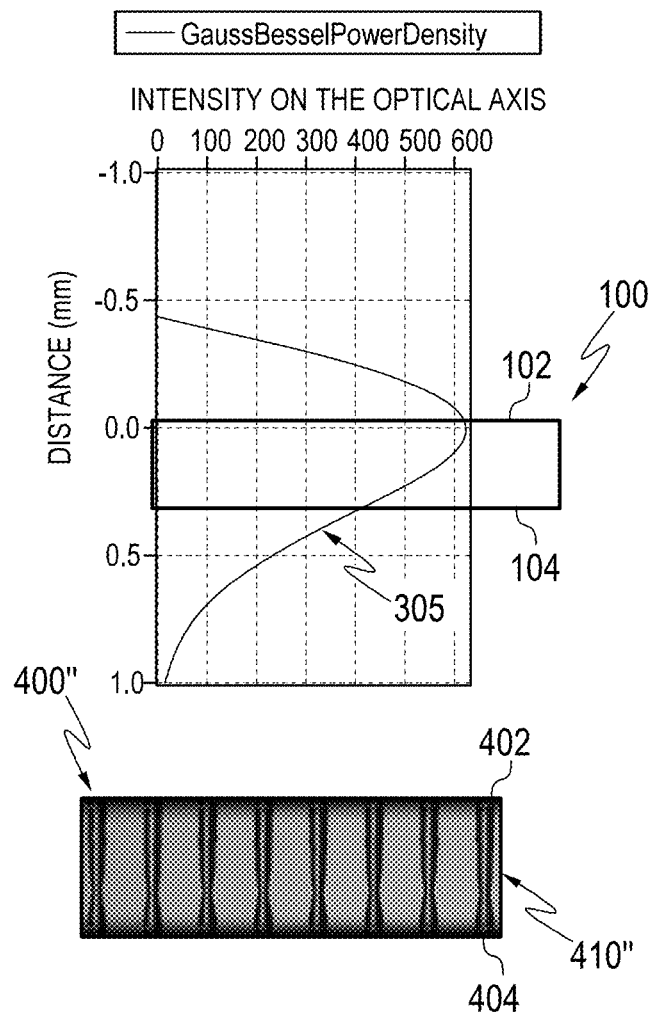
FIG. 5C depicts vias formed in a transparent workpiece as a result of a laser-damage-and-etch process when a focusing position of a pulsed laser beam is in a third position with respect to the transparent workpiece, according to one or more embodiments described herein.

FIG. 5B graphically illustrates a shift of the maximum intensity 305 of the laser beam focal line to the first surface 102 of the transparent workpiece 100. FIG. 5B further illustrates an example transparent workpiece 400' with vias 410' following an etching process having a waist that is closer to the first surface 402 than the second surface 404. FIG. 5C graphically illustrates a shift of the maximum intensity 305 of the laser beam focal line to the second surface 104 of the transparent workpiece 100. FIG. 5C further illustrates an example transparent workpiece 400" with vias 410" following an etching process having a waist that is closer to the second surface 404 than the first surface 402. Shifting the waist w leads to an asymmetrical via about a plane through a center of the transparent workpiece 100.

As is apparent from FIGS. 5A-5C, the properties of the defects 120 formed in the transparent workpiece 100 bear a close relationship to the form that the vias 110 take after application of an etching solution to the transparent workpiece 100. The relationship between the positions of the optical intensity distribution of the pulsed laser beam focal line 313 and the transparent workpiece 100 directly impacts the geometry and width profile of the vias 110. Given this, it is crucial to ensure proper positioning of the transparent workpiece 100 with respect to the pulsed laser beam focal line 313 to form vias 110 having a desired geometry. It is also critical to monitor other aspects of the laser processing system, such as energy output of the pulsed laser beam source 300, as the amount of energy incident at a particular location within the transparent workpiece 100 generally determines the shape of the eventual via at that point. In order for such aspects of the laser processing system to be monitored, a way of inspecting defects formed in the transparent workpiece 100 is necessary.

Figure 6:
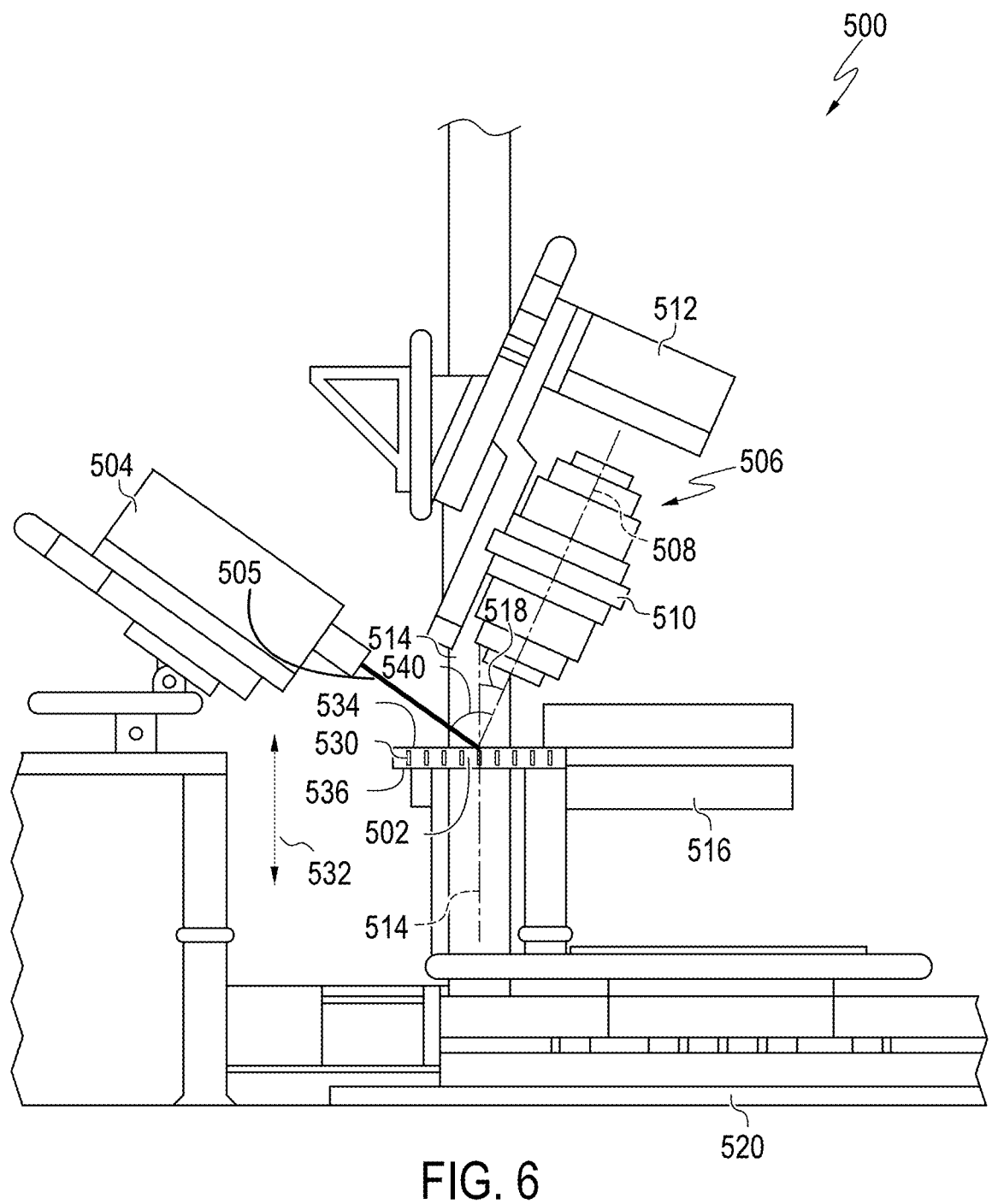
FIG. 6 schematically depicts an inspection system for inspecting laser defects formed in a transparent workpiece, according to one or more embodiments described herein.

Referring now to FIG. 6, an inspection system 500 for inspecting laser defects formed in a transparent workpiece is shown, according to an example embodiment. The inspection system 500 is configured to image defects formed in a transparent workpiece 502 in a non-invasive manner. For example, the inspection system 500 is capable of imaging a plurality of defects 530 formed in the transparent workpiece 502 without the transparent workpiece 502 being cut and polished, as in conventional imaging methods. The inspection system 500 is thus beneficial over existing methods in that the defects 530 may be inspected without processing the transparent workpiece, saving time and cost. As described below, the inspection system 500 is capable of simultaneously imaging a greater number of as-formed defects 530 in the transparent workpiece 502 than existing methods while making less manipulations to the transparent workpiece 502.

The transparent workpiece 502 may be similar to the transparent workpiece 100 described herein with respect to FIGS. 1A and 1B, with the exception that a chemical etching solution is not yet applied to the transparent workpiece 502 so as to form, for example, a plurality of TGVs in the transparent workpiece. In other words, the transparent workpiece 502 is disposed in the inspection system 500 to be imaged thereby after being subjected to laser processing but prior to being chemically etched.

The transparent workpiece 502 includes a first surface 534 and a second surface 536. A plurality of defects 530 are formed in the transparent workpiece 502 by, for example, the laser processing techniques described herein with respect to FIGS. 3A, 3B, and 4. The defects 530 may vary depending on the desired profiles of the vias to be formed in the transparent workpiece 502 as a result of chemical etching. For example, in some embodiments, the plurality of defects 530 may possess damage profiles similar to the defects 120 described with respect to FIG. 2B. In other embodiments, the plurality of defects 530 may have a substantially uniform damage profile.

The plurality of defects 530 may extend in a defect direction 532. In the example shown, the direction is parallel to a surface normal 514 of the first surface 534. It should be understood that various alternative embodiments are envisioned where the defect direction 532 is not parallel to the surface normal 514 and the defect direction 532 extends at a defect angle to the surface normal 514. Moreover, embodiments are also envisioned where all of the plurality of defects 530 do not extend in the same defect direction 532. For example, in one embodiment, a first subset of the defects 530 may extend in a first defect direction, while a second subset of the defects 530 may extend in a second defect direction that is different from the first defect direction.

The inspection system 500 includes an illumination source 504 and an imaging system 506. The illumination source 504 is configured to direct illumination light 505 onto the plurality of defects 530. Illumination source 504 may take a number of forms depending on the implementation. For example, in some embodiments, the illumination source 504 is a high intensity light emitting diode (LED) or laser configured to emit light at a chosen spectrum. For example, in one embodiment, a cold-light source, such as the CL 6000 LED is used as the illumination source 504. In embodiments, the illumination source 504 may generally comprise a non-coherent light source such as a LED emitting light within a specified spectral range (e.g., a blue LED) In some embodiments, it is beneficial to utilize a low numerical aperture ("NA") illumination source to minimize scattering caused by, for example, particulate contamination of the first and second surfaces 534 and 536 of the transparent workpiece 502. If the illumination source 504 has a low NA, intensity variations within the field of view of the imaging system 506 are beneficially reduced over embodiments having larger NA illumination sources, though utilization of such higher NA illumination sources is still possible.

The illumination light 505 is provided to the transparent workpiece 502 at an illumination angle 540 relative to the defect direction 532. The illumination angle 540 may vary depending on the implementation. For example, in some embodiments using edge illumination for defects having a defect direction 532 aligned with the surface normal 514, the illumination angle 540 may be approximately 90 degrees such that the illumination light 505 extends within five degrees of the first surface 534. In other embodiments, the illumination angle 540 is closer to the surface normal 514. The optimal illumination angle 540 may depend on the particular profiles of the defects 530 being inspected as well as the material that the transparent workpiece 502 is constructed of and defect direction 532. For example, in embodiments where the transparent workpiece 502 is constructed from high purity fused silica, edge illumination (where the illumination light 505 is approximately parallel to the first surface 534) may be preferred to generate high contrast images of defects having defect direction 532 aligned with surface normal 514. In other embodiments where the transparent workpiece 502 is constructed from an alkaline earth boro-aluminosilicate-based material (e.g., such as Corning Eagle XG® glasses), a smaller illumination angle 540 may be beneficial for contrast.

While the illumination light 505 is shown to be provided directly to the transparent workpiece 502 by the illumination source 504, it should be appreciated that various embodiments may include illumination optics (not shown) disposed between the illumination source 504 and the transparent workpiece. For example, in some embodiments, the illumination optics include an illumination lens configured to provide illumination light 505 having a desired NA and shape to the transparent workpiece 502. For example, in embodiments where edge illumination is used, the illumination optics may be configured to produce substantially line-shaped illumination light (e.g., the illumination optics may include a pair of cylindrical lenses arranged to generate such line-shaped illumination light). In other embodiments (e.g., for edge illumination), the illumination optics include an optical fiber extending between the illumination source 504 and the transparent workpiece 502. The illumination optics may also be configured to adjust an aspect of the illumination light 505. For example, in some embodiments, the illumination optics include a polarization-adjusting element such as a half waveplate. Adjusting the polarization of the illumination light 505 may increase sensitivity to different aspects of the defects 530. In some embodiments, the illumination optics may include an element (e.g., a bandpass color filter) to adjust a wavelength of the illumination light. Such adjustments to wavelength and/or polarization of the illumination light 505 may increase sensitivity to defect fractures and property changes of the transparent workpiece 502 in areas surrounding the defects 530.

Alternatively or additionally, the inspection system 500 may include more than one illumination source 504. In some embodiments, each illumination source 504 may be configured to emit similar illumination light 505, and the addition of illumination sources 504 serves to increase the intensity of the illumination light 505 to get better sensitivity and scanning speed. In some embodiments, the inspection system 500 includes multiple illumination sources 504, with each illumination source 504 being adapted to emit different illumination light 505. For example, the illumination sources 504 may emit light having different wavelengths to provide sensitivity to either the defects 530 or areas of the first surface 534 surrounding the defects 530. In another example, the inspection system 500 may include a first illumination source 504 configured to emit visible light to image the defects and a second illumination source 504 configured to emit UV light to enable examination of fluorescence variation around the area of the defects 530.

Referring still to FIG. 6, the inspection system 500 includes an imaging system 506 configured to detect a scattering image signal of illumination light 505 scattered from the plurality of defects 530. The imaging system 506 has an imaging axis 508. The imaging axis 508 extends at an imaging angle 518 to the defect direction 532. As depicted in FIG. 6, the defect direction 532 extends in a direction of the surface normal 514 of the transparent workpiece 502. In implementations where the defect direction 532 extends at an angle relative to the surface normal 514, the imaging angle 518 is measured relative to the defect direction 532 and not with respect to the surface normal 514. Generally, the imaging angle 518 is non-zero. In some embodiments the imaging angle 518 is from 30 degrees to 60 degrees or from 40 degrees to 50 degrees. Such an imaging angle 518 generally facilitates entireties of at least a subset of the plurality of defects 530 formed in the transparent workpiece 502 to be within a field of view of the imaging system 506. For example, in embodiments where the plurality of defects 530 extend through an entirety of a thickness of the transparent workpiece 502 (i.e., from the first surface 534 to the second surface 536), the imaging angle 518 facilitates illumination light 505 scattered from all portions (e.g., all segments) of at least a subset of the defects 530 reaching the imaging system 506. In other words, the imaging angle 518 facilitates the scattering image signal containing information with respect to the entire damage profiles of the defects 530 contained within the field of view of the imaging system 506. In some embodiments, the imaging angle 518 is selected based on the material that the transparent workpiece 502 is constructed of (e.g., based on light refraction at the first surface 534.

The imaging system 506 includes an imaging lens 510 disposed on the imaging axis 508 and a camera 512 (or imaging detector). The imaging lens 510 may include a plurality of optical components configured to direct the scattering image signal from the transparent workpiece 502 to the camera 512. For example, in some embodiments, the imaging lens 510 is configured to provide a NA and magnification such the entireties of at least a subset of the defects 530 are simultaneously within a field of view of the imaging system 506. As such, the NA and magnification of the imaging lens 510 may be selected based on a thickness of the transparent workpiece 502 to ensure that entireties of at least a subset of the defects 530 are simultaneously within the depth of field. For example, in certain implementations, the transparent workpiece 502 possesses a thickness of between 200 µm and 700 µm. In this example, an imaging lens 510 having a NA of less than 0.2 and a magnification of less than 3 (e.g., 2.5) was found to image through the entire transparent workpiece 502. It should be appreciated that the imaging lens 510 may have a broad array of configurations of NA and magnification adaptable for multiple working distances. For example, in one embodiment, the imaging lens 510 is a microscope objective lens (e.g., a Zeiss® Stemi 508) possessing field of views up 122 mm and 8× magnification. In such embodiments, the preferred ranges described herein may comprise recommended working parameters to adjust such imaging lenses for laser defect inspection.

In some embodiments, the scattering image signal detected by the imaging system 506 is a dark field scattering image signal. As such, illumination light 505 not scattered by the defects 530 may not be captured by the imaging system 506. In some embodiments, such un-scattered illumination light 505 is not detected by virtue of the difference between the illumination angle 540 and the imaging angle 518 (i.e., un-scattered illumination light 505 is outside of the field of view of the imaging system 506). In some embodiments, components of the inspection system 500 (e.g., the illumination optics or the imaging lens 510) may include light blocking elements (e.g., apertures) to block such unscattered illumination light 505.

The scattering image signal detected by the imaging system 506 may be particularly weak in some embodiments (e.g., have intensities as low as about 8 in an 8-bit grayscale intensity measurement from 0 to 255). This is especially the case in embodiments where the imaging system 506 is configured to detect a dark field scattering signal. Accordingly, the camera 512 may be adapted to capture such low intensity signals. For example, in various embodiments, the camera 512 may comprise an area-scan or time delayed integration (TDI) line-scan camera for cases where the scattering image signal is particularly weak. In some embodiments, the camera 512 comprises a microscope camera (e.g., a Zeiss® Axiocam 105 Color) having an exposure time range of 100 µs to 2 µs and a frame rate of up to 33 images per second. In some embodiments, images are captured by the inspection system 500 using an exposure time of between 50 ms and 500 ms (e.g., about 200 ms). In embodiments where the camera 512 is used as a TDI line-scan camera, the camera 512 may be operated at frame rates that are relatively high (e.g., up to 33 images per second).

The transparent workpiece 502 is held in an imaging position by a holder 516. The holder 516 may include a slot for holding portions of the transparent workpiece 502 that are not being imaged. In some embodiments, the holder 516 may include electronic positioning device (not shown) configured to adjust the portion of the transparent workpiece 502 within the field of view of the imaging system 506. In some embodiments, the holder 516 is attached to a translatable motion stage 520 to move the transparent workpiece 502 relative to the imaging system 506 such that the imaging system 506 may scan different portions of the transparent workpiece 502. For example, in implementations where the camera 512 is a line scan camera, the motion stage 520 may be moved such that different portions of individual ones of the defects 530 are within the field of view of the imaging system 506 such entireties of the defects 530 are imaged by the line scan camera. In various embodiments, the illumination source 504, the imaging system 506, or both the illumination source 504 and the imaging system 506 (or portions thereof) are disposed on motion stages to render the inspection system highly adjustable with respect to imaging distance, illumination angle 540, and imaging angle 518.

Figure 7A:
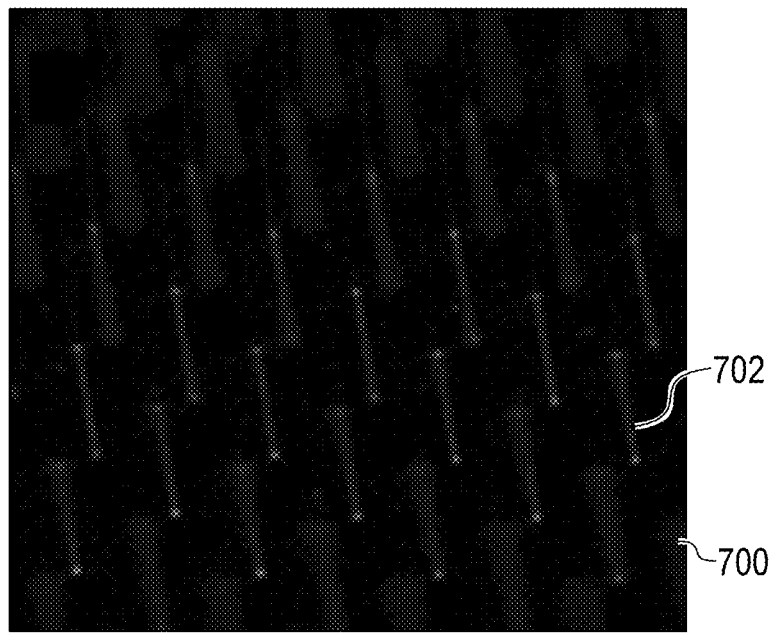
FIG. 7A depicts a grayscale image obtained from the inspection system of a plurality of laser defects in a transparent workpiece having a first damage profile, according to one or more embodiments described herein.

FIG. 7A depicts an example image of a transparent workpiece 700 obtained by the inspection system 500. In this example, the imaged transparent workpiece 700 possess a plurality of defects 702 having a substantially uniform damage profile (i.e., the damage level in the transparent workpiece did not substantially vary as a function of depth within the transparent workpiece). The shown image was obtained using an illumination angle of approximately 90 degrees (edge illumination) and detecting a dark field scattering image signal. As shown, the image includes entireties of multiple defects 702, and the images of each defect 702 are consistent. Each defect 702 imaged appears to be substantially uniform within a thickness of the transparent workpiece 700. Brighter portions on the ends of the defects 702 appear to be attributable to stronger scattering from craters formed in the surfaces of the transparent workpiece 700 in areas on the surfaces surrounding each defect 702.

Figure 7B:
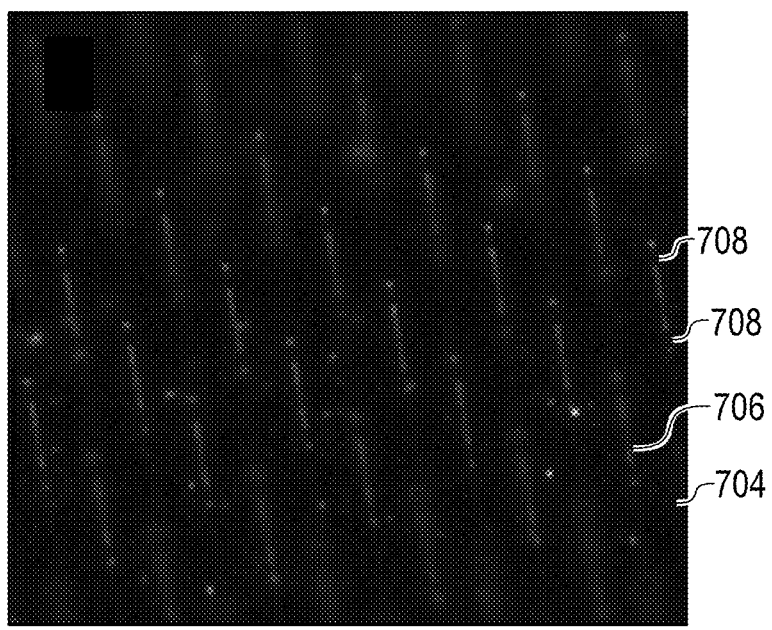
FIG. 7B depicts a grayscale image obtained from the inspection system of a plurality of laser defects in a transparent workpiece having a second damage profile, according to one or more embodiments described herein.

FIG. 7B depicts an example image of another transparent workpiece 704 obtained by the inspection system 500. In this example, the transparent workpiece 704 possesses a plurality of defects 706 possessing a non-uniform damage profile similar to the defects 120 described with respect to FIG. 2B. For example, the defects 706 may each include higher damage segments extending from outer surfaces of the transparent workpiece 704 and a relatively lower damage segment in the interior of the transparent workpiece 704 extending between the relatively higher damage segments As shown, the image includes entireties of multiple defects 706. Importantly, the defects 706 are imaged differently than the defects 702 by the inspection system 500. As shown, each defect 706 is imaged to have darker (e.g., lower intensity) regions 708 disposed relatively close to each surface of the transparent workpiece 704.

These darker regions 708 largely correspond to the higher damage segments of the defects 706. In other words, by analyzing the length of the darker regions 708 within each defect 706 one can measure the damage profile generated by laser processing. As described with respect to FIGS. 5A, 5B, and 5C, for example, a focusing position of a defect forming optical system used to form the defects 706 may impact the relative length of the higher damage segments. Given this, the focusing position of the defect forming optical system would be reflected by the image obtained by the inspection system 500. As such, the inspection system 500 provides a means to inspect profiles of laser defects immediately after formation of such defects, without cutting the transparent workpiece.

Figure 8A:
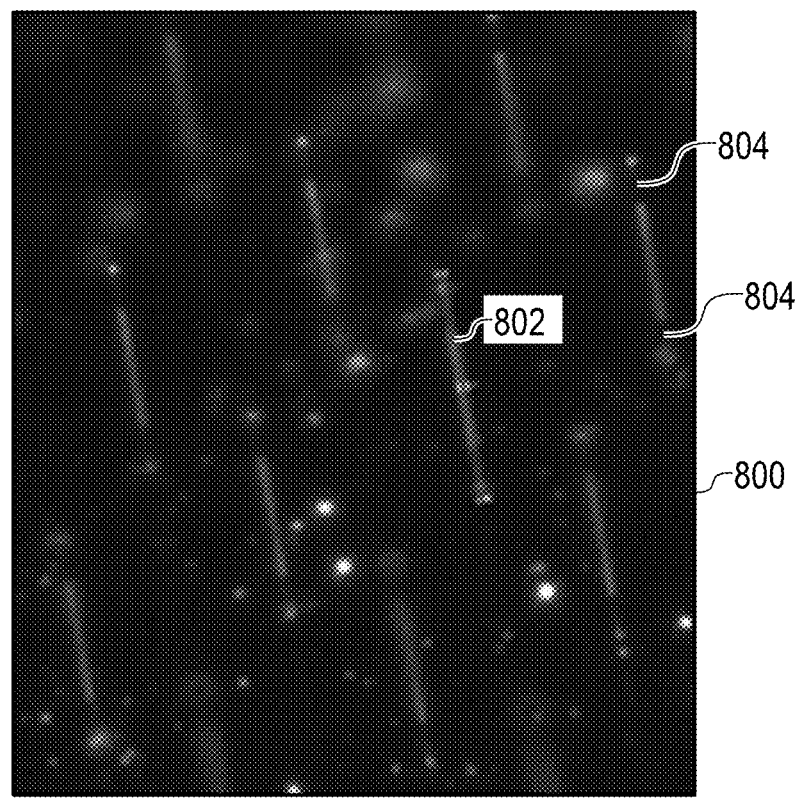
FIG. 8A depicts a grayscale image obtained from the inspection system of defect in a transparent workpiece having a damage profile, according to one or more embodiments described herein.

FIG. 8A depicts an example image of another transparent workpiece 704 obtained by the inspection system 500. In this example, the transparent workpiece 800 possesses a plurality of defects 802 similar to the defects 706 of the transparent workpiece 704 described with respect to FIG. 7B. As shown, each defect 802 includes darker regions 804 representing the higher damage portions near the surfaces. FIG. 8B shows a chart of intensity profiles derived from the dark field scattering image signals shown in FIG. 8A. Each of the intensity profiles refers an intensity of the dark field scattering image signals as a function of depth within the thickness of the transparent workpiece 800. Each intensity profile includes dips 806 corresponding to the darker regions 804. Each intensity profile measurement also includes consistently located peaks 808, 810, 812, and 814. Without wishing to be bound by theory, the peaks 808 and 814 nearest the surface are thought to originate from surface cavities formed through the laser processing. Inner peaks 810 and 812 are thought to originate from boundaries of the higher damage segments of the defects 802 (e.g., at boundaries of the segments 120A and 120B of the defects 120 described with respect to FIG. 2B). Note that a greater amount of laser exposure does not always mean a greater amount of light scattering will occur. Variations in the light scattering intensity between two regions do indicate that different levels of material modification have been imparted to the two regions by the laser. But the light scattering signal, and even etching rate of a modified region, does not necessarily increase monotonically with laser exposure.

Figure 8C:
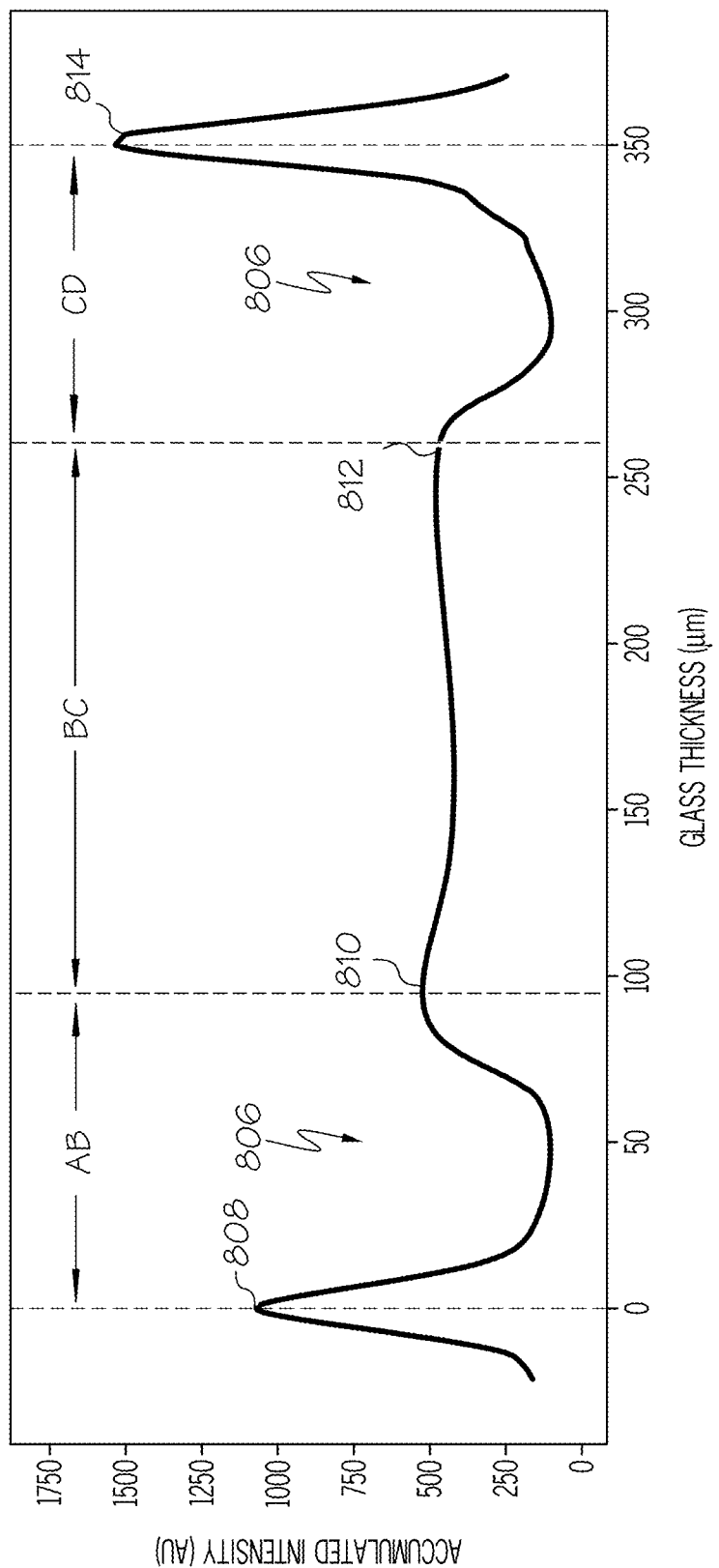
FIG. 8C depicts an average intensity profile of the laser defect depicted in FIG. 8A, according to one or more embodiments described herein.

FIG. 8C depicts an average intensity profile for the intensity profiles depicted in FIG. 8B. The first segment AB between peaks 808 and 810 represents a length of a first higher damage segment of the defect 802 extending from a first surface of the transparent workpiece 800. The second segment BC represents a lower damage segment on an interior of the transparent workpiece 800. The third segment CD represents another higher damage segment extending from a second surface of the transparent workpiece 800.

Figure 9A:
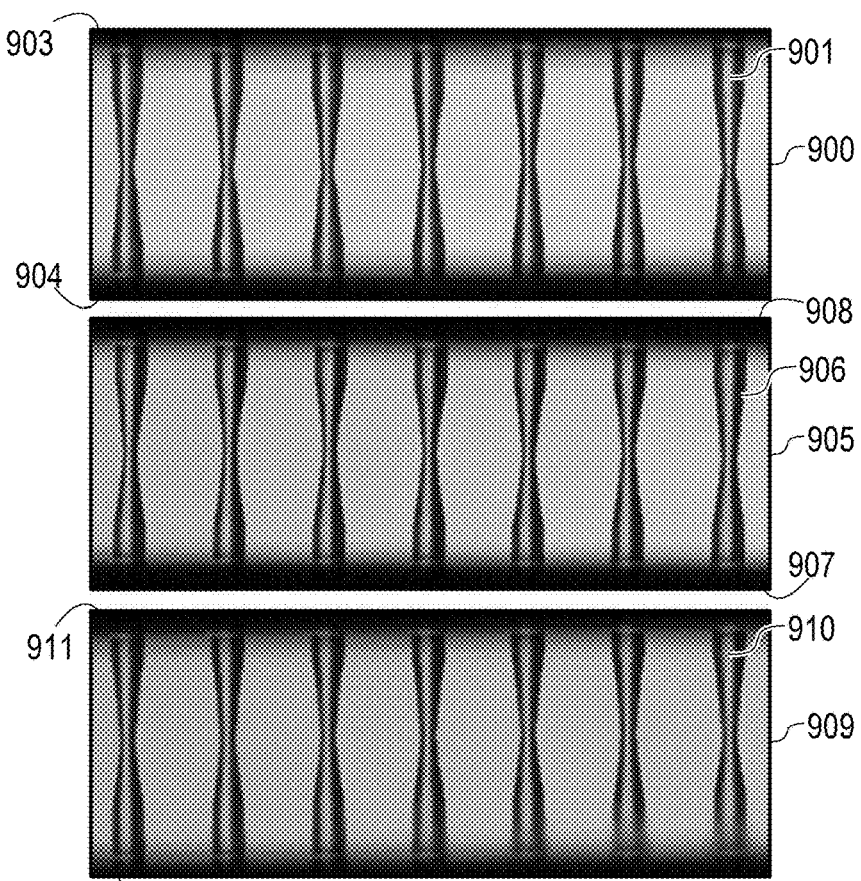
FIG. 9A depicts images of three transparent workpieces having vias with different profiles, according to one or more embodiments described herein.

In some embodiments, a ratio of the length of the first segment AB to a ratio of the third segment CD provides an accurate representation of a focal distance of a defect forming optical system of a laser processing system. This was verified through the measurements described with respect to FIGS. 9A, 9B, 9C, and 9D. As shown in FIG. 9A, three transparent workpieces 900, 905, and 909 with equal thickness were processed by a laser-damage-and-etch process described herein. A defect forming optical system (such as the defect forming optical system 200 described with respect to FIG. 3A) was used to generate a laser beam focal line in the transparent workpieces. For each of the transparent workpieces 900, 905, and 909, a different relative focusing position of the defect forming optical system was used. The term "focal position," when used in reference to a laser beam focal line, refers to a position of maximum optical intensity within the laser beam focal line and should not be confused with a "focal point" of Gaussian laser beam. For example, for the transparent workpiece 900, a focusing position 100 µm closer to a first surface 903 than a center of the transparent workpiece 900 was used. For the transparent workpiece 905, a focusing position at the center of the transparent workpiece 905 was used. For the transparent workpiece 909, a focusing position 100 µm closer to a second surface 912 than a center of the transparent workpiece 909 was used. After a chemical etching solution was applied to each of the transparent workpieces 900, 905, and 909, the images shown in FIG. 9A were obtained through conventional microscopy. As shown, the transparent workpiece 900 has vias 901 with waists closer to its first surface 903, the transparent workpiece 905 has vias 906 with waists approximately at the center of the transparent workpiece 905, and the transparent workpiece 909 has vias 910 with waists closer to its second surface 912.

Figure 9B:
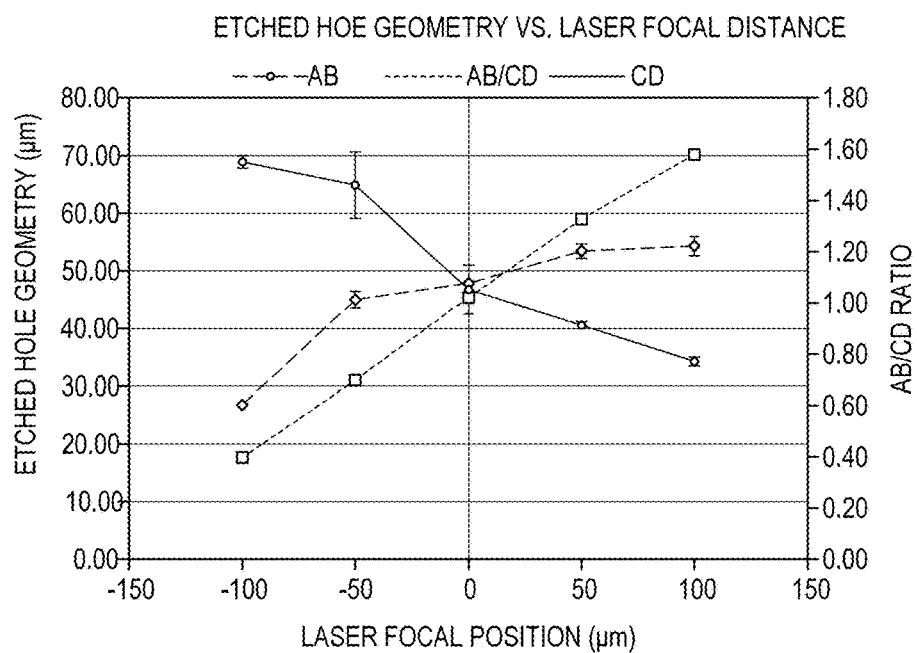
FIG. 9B depicts a chart showing measurements of lengths of segments of the vias shown in FIG. 9A as a function of laser focal position; according to one or more embodiments described herein.

FIG. 9B depicts a chart of the via profiles imaged in FIG. 9A. As used in FIGS. 9B, 9C, and 9D, the "laser focal position" refers to a position of maximum laser intensity relative to a center of the transparent workpieces 900, 905, and 909 in a thickness direction. A laser focal position of 0 µm in FIGS. 9B, 9C, and 9D indicates that the position of maximum laser intensity corresponds to a center of the transparent workpiece. Positive or negative laser focal positions indicates that the position of maximum laser intensity is closer to a particular one of the surfaces of the transparent workpiece. In embodiments, an edge detection algorithm was used to process the images depicted in FIG. 9A to determine lengths of the segments AB and CD of the vias 901, 906, and 910. Two additional data points than those depicted in FIG. 9A, with relative focusing positions offset from the center of the transparent workpiece by 50 µm are added to the chart. The dashed line depicts lengths of the segment AB as a function of focusing position relative to a center of the transparent workpiece. The dotted line depicts lengths of the segment CD as a function of focusing position relative to a center of the transparent workpiece. The solid line depicts a ratio of the lengths of the segments AB to the lengths of the segments CD as a function of focusing position. As shown, the length ratio for the segments AB and CD is approximately 1 when the focusing position is centered with respect to the transparent workpiece.

Figure 9C:
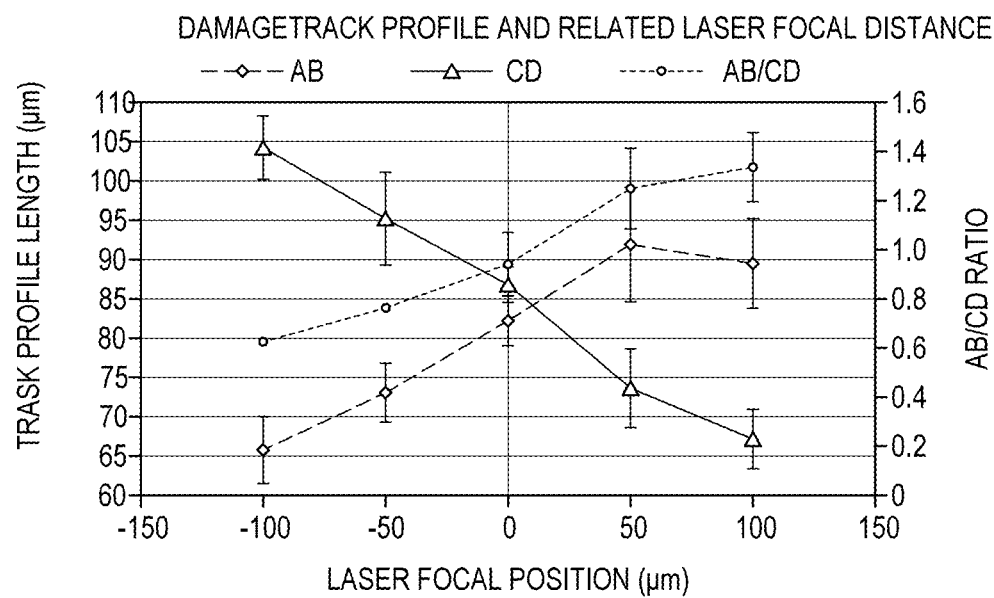
FIG. 9C depicts a chart showing lengths of segments of defects as a function of laser focal position obtained from a scattering image signal of the defects used to form the vias shown in FIG. 9A by an inspection system, according to one or more embodiments described herein.

A similar procedure measuring lengths of higher damage segments of defects (e.g., like the segments 120A and 120D described with respect to FIG. 2B) before etching to form vias was also performed. For example, intensity profiles such as the one described with respect to FIG. 8B were generated and the distances between adjacent local maximums in the intensity profiles were measured to determine the lengths of the higher damage segments. A chart of the results is depicted in FIG. 9C. The dashed line depicts a length of a first higher damage segment (corresponding to the segment AB) extending from the first surfaces 903, 908, and 911 of the transparent workpieces 900, 905, and 909. The solid line depicts a length of a second higher damage segment (corresponding to the segment CD) extending from the second surfaces 904, 907, and 912 of the transparent workpieces 900, 905, and 909. The dotted line depicts a ratio of the segment lengths.

Figure 9D:
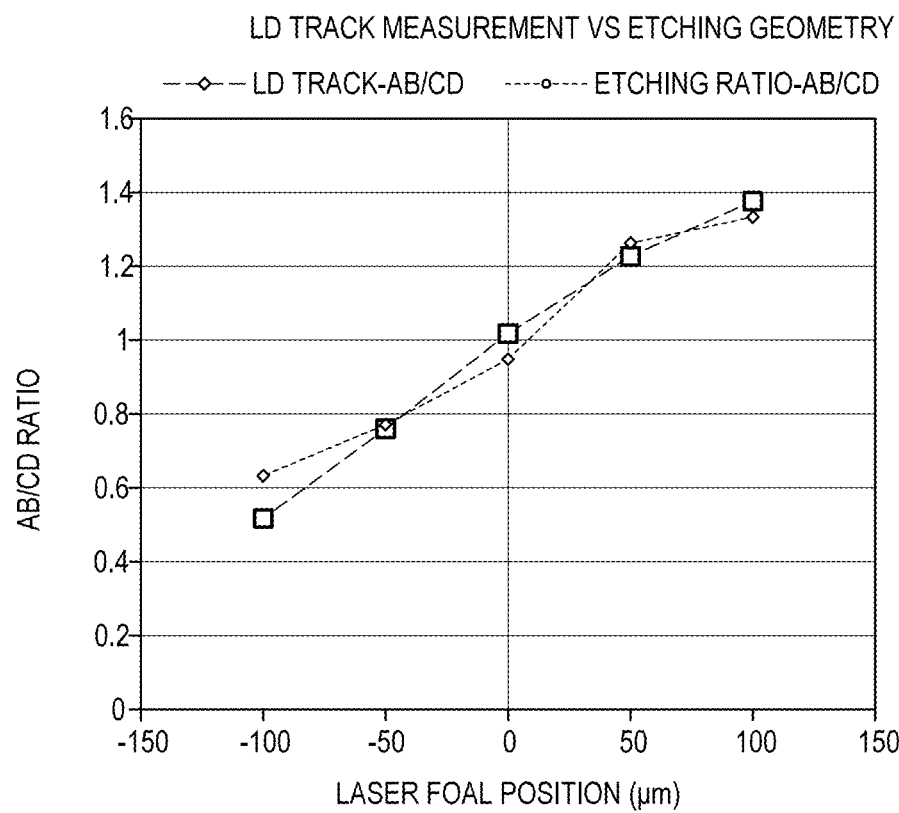
FIG. 9D depicts a chart showing a correlation between the measurements of the lengths of the segments depicted in FIG. 9B and FIG. 9C, according to one or more embodiments described herein.

The results of the ratios of the lengths of the defect segments shown in FIG. 9C (laser damage (LD) track—AB/CD) are depicted with the ratio of the lengths of the via segments depicted in FIG. 9B (etching ratio—AB/CD) are depicted side-by-side in FIG. 9D (with the results shown in FIG. 9B being corrected for etching-induced thickness reduction). As shown, the AB/CD ratio results for damage segments (before etching) and the corresponding via segments (after etching) are highly correlated with one another. This indicates that imaging defects by the inspection system 500 provides a quality prediction of the eventual shapes of the vias that will result from chemical etching without having to do the chemical etching. Generally, the lengths of the higher damage segments AB and CD of defects such as the one shown in FIG. 2B can be correlated with lengths $L_1$ and $L_4$ of straight regions (e.g., the portions 112 and 114 described in FIG. 2A), and the lengths of the lower damage segments BC of defects such as the one shown in FIG. 2B can be correlated with lengths $L_2$ and $L_3$ (e.g., the portions 116 and 118 described in FIG. 2A) of a via formed by an etching process as follows:

$$AB(z)*T/[AB(z)+BC(z)+CD(z)]=k_1*L_1(z)+k_2*E/2 \qquad (1)$$

$$CD(z)*T/[AB(z)+BC(z)+CD(z)]=k_3*L_4(z)+k_4*E/2 \qquad (2)$$

$$BC(z)*T/[AB(z)+BC(z)+CD(z)]=k_5*L_2(z)+k_6*L_3(z) \qquad (3)$$

Where T is the pre-etch glass thickness, E is the etch removal amount, and $k_1$ to $k_6$ are 6 etching process specific constants that can be determined empirically through experiments for particular laser intensity distribution, focal line characteristics, etch conditions, workpiece thickness and composition etc. As described herein, the performance of such correlations provides a means for characterizing laser processing systems and a way of predicting what etching process is needed to produce vias having desired profiles.

In various embodiments, additional information from defects formed in transparent workpieces may also be gained from the scattering image signal obtained by the inspection system 500. For example, in some embodiments, an intensity of the scattering imaging signal measured by the imaging system 506 is dependent on an energy of a pulsed laser beam 312 output from a pulsed laser beam source 300 of a laser processing system. In one example, two sets of defects were formed in a transparent workpiece: a first with a pulsed laser beam 312 outputting a pulse burst energy of 80 µJ; and a second with a pulsed laser beam 312 outputting a pulse burst energy of 100 µJ. It was found that the second set of defects consistently produced a higher intensity scattering image signal than the first defects. As such, periodic inspection of defects by the inspection system 500 can be used to monitor an energy output of the pulsed laser beam source 300. Intensity profiles of the scattering image signal measured by the inspection system 500 were also shown to vary with composition of the transparent workpiece. In various embodiments, libraries of scattering image signal measurements, each with a corresponding glass composition, laser processing system configuration (e.g., energy output, focusing position, etc.), and eventual etched via profiles, may be created to aid in configuring the laser processing system to produce vias having a desired shape.

Figure 10:
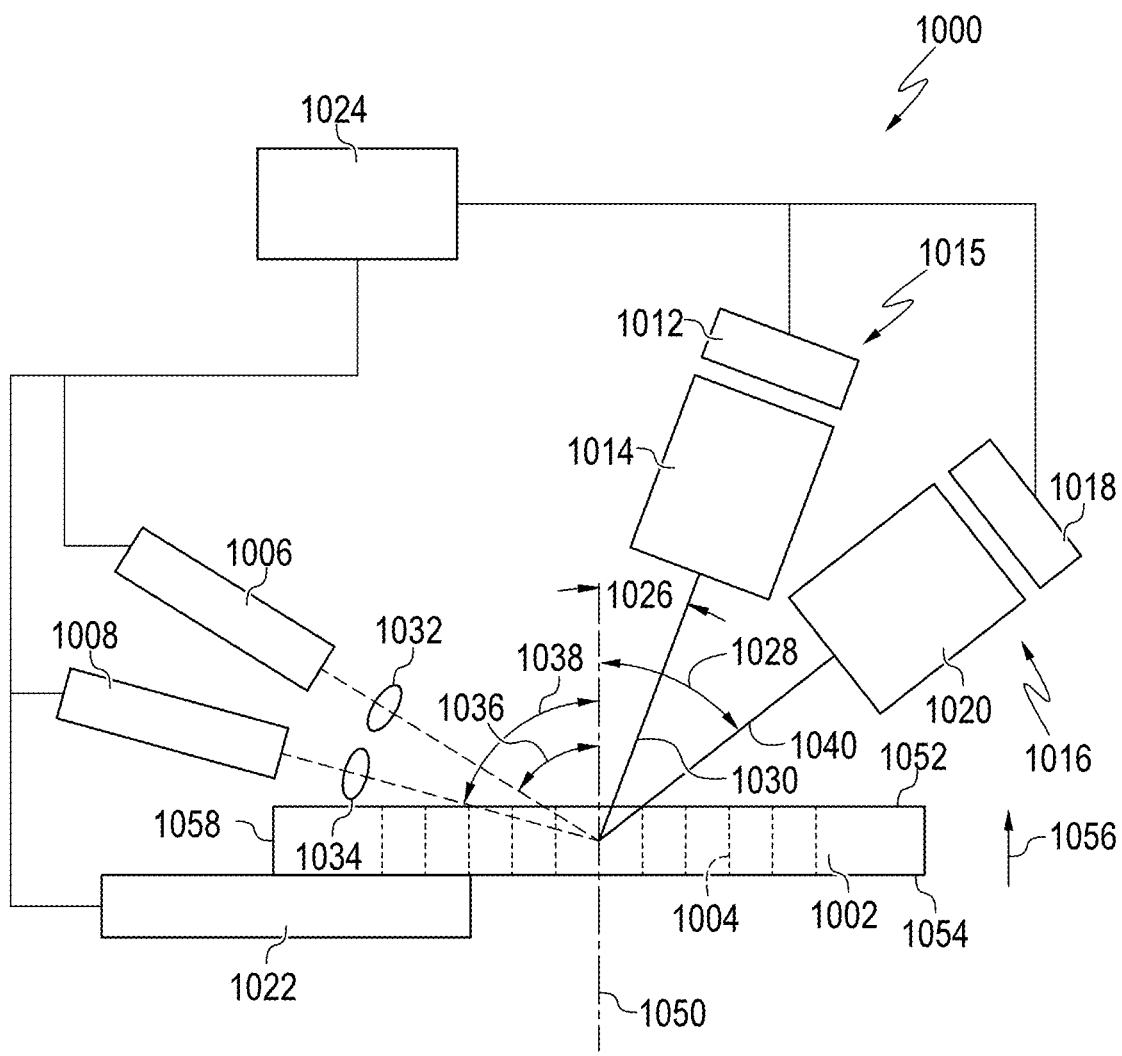
FIG. 10 schematically depicts an inspection system for imaging defects in a transparent workpiece, according to one or more embodiments described herein.

Referring now to FIG. 10, an inspection system 1000 is schematically depicted. The inspection system 1000 is shown to be imaging a transparent workpiece 1002. The transparent workpiece 1002 may be similar to the transparent workpiece 100 described herein with respect to FIGS. 1A and 1B, with the exception that a chemical etching solution is not yet applied to the transparent workpiece 1002 so as to form, for example, a plurality of TGVs in the transparent workpiece 1002. In other words, the transparent workpiece 1002 is disposed in the inspection system 1000 to be imaged thereby after being subjected to laser processing but prior to being chemically etched.

The transparent workpiece 1002 includes a first surface 1052 and a second surface 1054. A plurality of defects 1004 are formed in the transparent workpiece 1002 by, for example, the laser processing techniques described herein with respect to FIGS. 3A, 3B, and 4. The defects 1004 may vary depending on the desired profiles of the vias to be formed in the transparent workpiece as a result of chemical etching. For example, in some embodiments, the plurality of defects 1004 may possess damage profiles similar to the defects 120 described with respect to FIG. 2B. In other embodiments, the plurality of defects 1004 may have a substantially uniform damage profile.

The plurality of defects 1004 may extend in a defect direction 1056. In the example shown, the defect direction 1056 is parallel to a surface normal 1050 of the first surface 1052. It should be understood that various alternative embodiments are envisioned where the defect direction 1056 is not parallel to the surface normal 1050 and the defect direction 1056 extends at a defect angle to the surface normal 1050. Moreover, embodiments are also envisioned where all of the plurality of defects 1004 do not extend in the same defect direction 1056.

The inspection system 1000 includes a first illumination source 1006 configured to provide illumination light through illumination optics 1032 to the transparent workpiece 1002 at a first illumination angle 1036. The inspection system 1000 includes a second illumination source 1008 configured to provide illumination light through illumination optics 1034 to the transparent workpiece 1002 at a second illumination angle 1038. The first and second illumination sources 1006 and 1008, as well as the associated illumination optics 1032 and 1034 are generally similar to the illumination source 504 described herein with respect to FIG. 6.

In various embodiments the illumination sources 1006 and 1008 generate different illumination light (e.g., having differing polarization, wavelength, and/or illumination angle) to generate different scattering image signals measured by the inspection system 1000. For example, in one embodiment, the first illumination source 1006 and the second illumination source 1008 provide light to the transparent workpiece 1002 having the same wavelength, but different polarizations (e.g., the polarizations may be rotated by 90 degrees with respect to each other). In another embodiment, the first illumination source 1006 and the second illumination source 1008 provide light to the transparent workpiece 1002 having the same polarization but different wavelengths. Such differing polarizations and/or wavelengths may provide imaging sensitivity to different defect features. For example, in one embodiment, the first illumination source 1006 provides visible illumination light in the transparent workpiece 1002 to measure a damage profile of the defects 1004, while the second illumination source 1008 provides UV illumination light to the transparent workpiece 1002 to assess fluorescence variation around the damage track area and identify changes in composition of the transparent workpiece 1002. Any combination and number of illumination sources may be used consistent with the present disclosure.

The inspection system 1000 includes a first imaging system 1015 including a first camera 1012 and first imaging lens 1014 configured to receive a first scattering image signal from the transparent workpiece 1002. The first imaging system 1015 includes a first imaging axis 1030 disposed at a first imaging angle 1026 with respect to the defect direction 1056 in which the defects 1004 extend. The inspection system 1000 includes a second imaging system 1016 including a second camera 1018 and second imaging lens 1020 configured to receive a second scattering image signal from the transparent workpiece 1002. The second imaging system 1016 includes a second imaging axis 1040 disposed at a second imaging angle 1028 with respect to the surface normal 1050 of the transparent workpiece 1002. Generally, the first imaging system 1015 and the second imaging system 1016 are similar to the imaging system 506 described with respect to FIG. 6.

In some embodiments, each of the imaging systems 1015 and 1016 is configured to image different portions of each of the defects 1004. For example, in one embodiment, the first imaging system 1015 is disposed at a first working distance from the transparent workpiece 1002 and the first imaging lens 1014 is configured to receive a scattering image signal from first portions of at least of a subset of the defects 1004 extending from the first surface 1052. The second imaging system 1016 is disposed at a second working distance from the transparent workpiece 1002 and the second imaging lens 1020 is configured to receive a scattering image signal from second portions of at least of a subset of the defects 1004 extending from the second surface 1054. In such embodiments, the combined first and second portions of the defects, imaged by the first and second imaging systems 1015 and 1016, respectively, constitute entireties of the subset of the defects 1004 such that the combined imaging systems 1015 and 1016 image the entireties of the defects 1004. Such an implementation may be beneficial over an implementation with a single imaging system because it reduces restrictions on the depth of fields for the imaging lenses 1014 and 1020, thereby allowing higher magnification to be used. More detailed images of the defects 1004 may be obtained. The inspection system 1000 may include any number of imaging systems configured to manage any arrangement of portions of the defects 1004 consistent with the present disclosure.

The transparent workpiece 1002 is shown to be disposed on a motion stage 1022. The motion stage 1022 is adapted to move the transparent workpiece 1002 relative to the imaging systems 1015 and 1016 to enable the defects 1004 to be scanned by the inspection system 1000. The inspection system 1000 is also shown to include a computing system 1024 communicably coupled to the illumination sources 1006 and 1008, imaging systems 1015 and 1016, and motion stage 1022. Generally, the computing system 1024 may control outputs of the illumination sources 1006 and 1008 to, for example, output illumination light when imaging of the transparent workpiece 1002 is desired. The computing system 1024 may also adjust the output of illumination sources 1006 and 1008 (e.g., a wavelength or polarization output thereby) to adjust a scattering imaging signal.

The computing system 1024 may also process image signals generated by cameras 1012 and 1018. For example, the computing system 1024 may process the image signal with an image processing algorithm to, for example, normalize the image pixel response, remove noise from the image signals, and correct for optical aberrations in, for example, the imaging lenses 1014 and 1020. The computing system 1024 may also generate intensity profiles for individual ones of the defects 1004 and determine lengths of various damage segments of the defects 1004 based on distances between peaks in the intensity profiles. The computing system 1024 may also include libraries of existing measurements taken by the inspection system 1000 and output determinations made based on accessing such libraries responsive to certain measurements being taken. For example, based on a particular intensity level of the scattering image signals measured with cameras 1012 and 1018, the computing system 1024 may identify the composition of the transparent workpiece 1002 based on existing measurements and/or identify an intensity output of a pulsed laser beam used to form the defects 1004. After the transparent workpiece 1002 is etched, the resulting vias may be also imaged and stored in the computing system 1024 for correlation with the images of the defects 1004, as described with respect to FIG. 9D.

Figure 11:
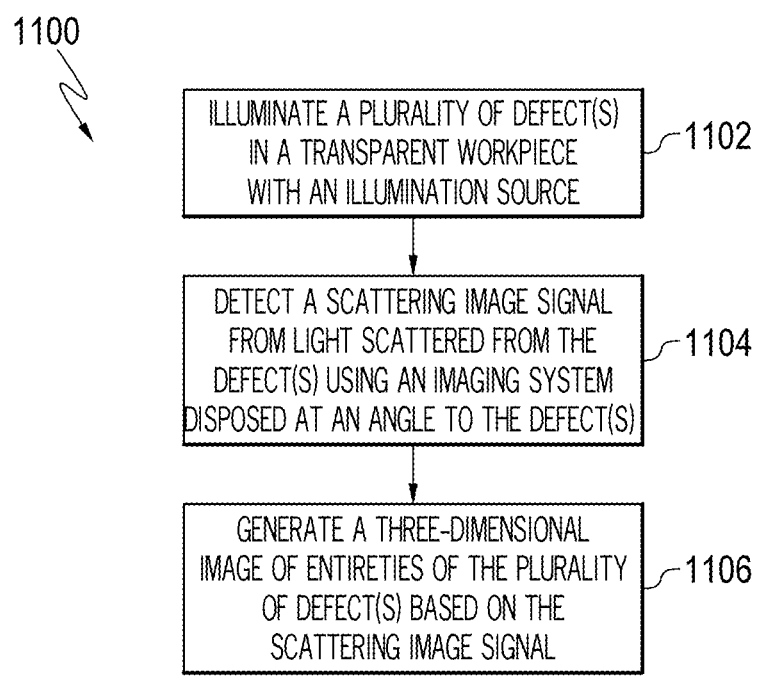
FIG. 11 depicts a method for generating a three-dimensional image of entireties of a plurality of defects formed in a transparent workpiece, according to one or more embodiments described herein.

FIG. 11 depicts a method 1100 for imaging a plurality of defects formed in a transparent workpiece. The method 1100 may be performed by the inspection system 1000 described with respect to FIG. 10 to image the plurality of defects 1004 formed in the transparent workpiece 1002. In a step 1102, the plurality of defects 1004 in the transparent workpiece 1002 are illuminated. As described herein, the illumination may take place by a single illumination source, such as the first illumination source 1006 or with multiple illumination sources (e.g., with both the first illumination source 1006 and a second illumination source 1008). Generally the first illumination source 1006 provides illumination light to the transparent workpiece 1002 through illumination optics 1032. The first illumination source 1006 may be a microscope cold light source, such as an LED, a laser, or any other light source. The illumination optics 1032 are configured to provide the illumination light to the transparent workpiece 1002 at an illumination angle 1036 relative to a surface normal 1050 of a first surface 1052 of the transparent workpiece 1002. For example, in one embodiment, the illumination optics 1032 are an optical fiber configured to provide edge illumination, where the illumination light enters an edge 1058 of the transparent workpiece 1002 at an illumination angle 1036 of approximately 90 degrees (e.g., extends approximately parallel, or within 5 degrees, of the first surface 1052 when the defect direction is aligned with the surface normal 1050). In another embodiment, the illumination optics 1032 are a lens (or lens system such as telecentric lens system) configured to provide low NA illumination light onto the first surface 1052 at smaller illumination angle 1036. As described herein, when multiple illumination sources 1006 and 1008 are used, such multiple illumination sources 1006 and 1008 may produce illumination light having different wavelength and/or polarization to provide sensitivity to different defect features.

In a step 1104, a scattering image signal from light scattered from the defects is detected using a first imaging system 1015 disposed at a first imaging angle 1026 from a defect direction 1056 of the plurality of defects 1004. The first imaging system 1015 includes a first camera 1012 and a first imaging lens 1014 disposed on an imaging axis 1030. As described herein, in some embodiments, the first imaging angle 1026 is selected such the entireties of at least a subset of the plurality of defects 1004 (e.g., extending from the first surface 1052 to the second surface 1054) are within a depth of field of the first imaging lens 1014. For example, the magnification and the numeral aperture of the first imaging lens 1014 may be selected based on a thickness of the transparent workpiece 1002 such that the scattering image signal directed to the first camera 1012 contains information regarding entire lengths of the defects 1004 within the subset of defects 1004 imaged. In some embodiments, the scattering image signal is also detected by a second imaging system 1016 disposed at a second imaging angle 1028 from the defect direction 1056 of the plurality of defects 1004. The first and second imaging systems 1015 and 1016 may each be configured to image different portions of the plurality of defects 1004 such that, in combination, the first and second imaging systems 1015 and 1016 image entireties of at least a subset of the plurality of defects 1004 formed in the transparent workpiece 1002.

In a step 1106, a three dimensional image of entireties of the plurality of defects based on the scattering image signal is generated. Image signals generated with the first camera 1012 and/or the second camera 1018 may be provided to the computing system 1024 and for processing and depiction on a display. For example, in some embodiments, the computing system 1024 includes an image processing algorithm performed by a processor (or other execution unit) that removes noise from the image signals and corrects for aberrations in the imaging lenses 1014 and 1020. The computing system 1024 may generate three dimensional images such as those depicted in FIGS. 7A and 7B. In some embodiments, the computing system 1024 may analyze portions of the three-dimensional image to obtain quantitative characteristics of the defects 1004. For example, the computing system 1024 may analyze image intensities of a pixel region corresponding to one of the defects 1004 to generate an intensity profile for that defect 1004 such as the one depicted in FIG. 8C. Distances between local maximums in the intensity profile may be identified to determine lengths of higher damage segments within the imaged defect 1004.

Figure 12:
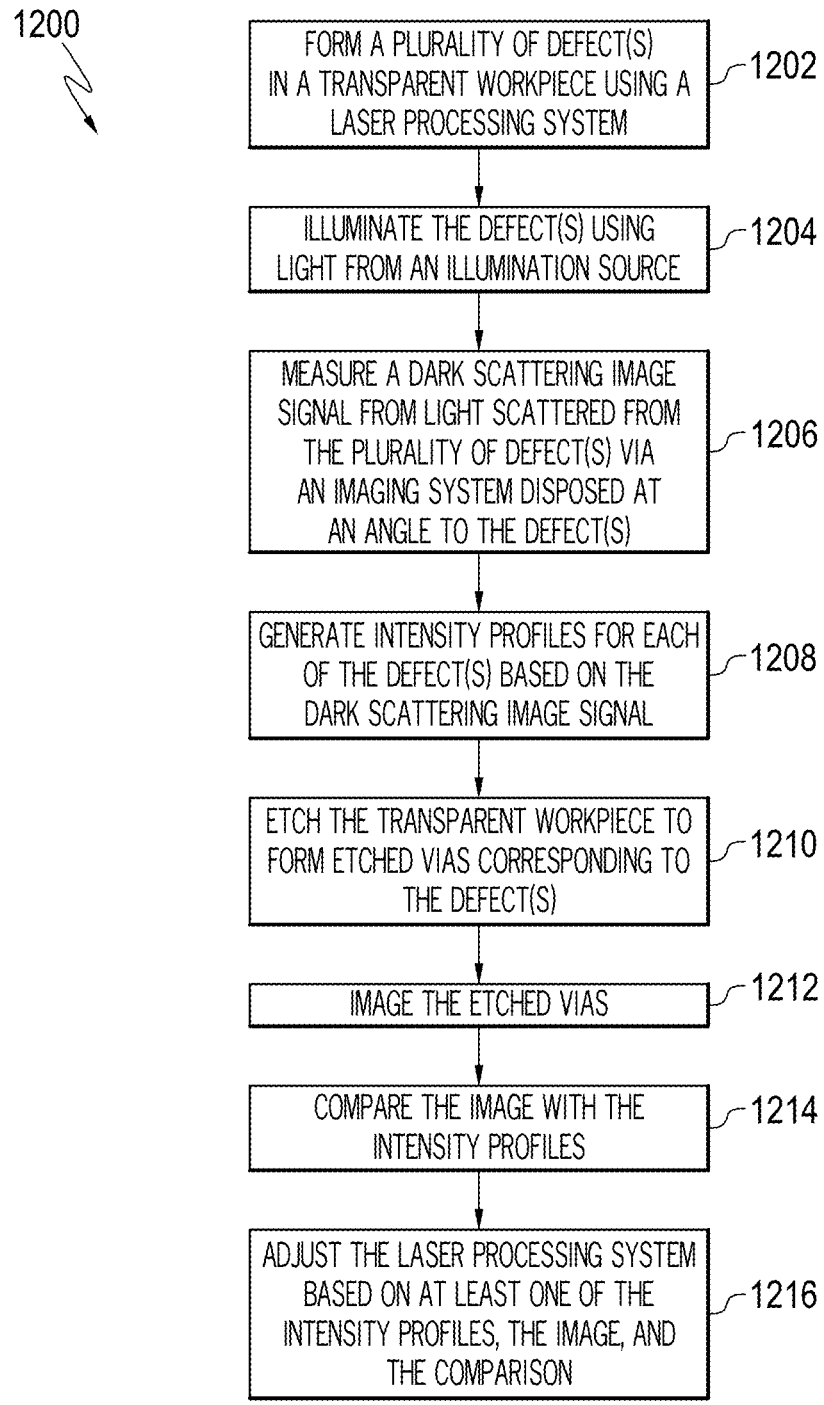
FIG. 12 depicts a method of characterizing and/or adjusting a laser processing system using a defect inspection system, according to one or more embodiments described herein.

FIG. 12 depicts a method 1200 for imaging a plurality of defects formed in a transparent workpiece. The method 1200 may be performed (at least in part) with the inspection system 1000 described with respect to FIG. 10. In a step 1202, a plurality of defects 1004 are formed in the transparent workpiece 1002. In some embodiments, the plurality of defects may be formed using a laser processing system including a defect forming optical system 200 described herein with respect to FIGS. 3A, 3B, and 4. For example, a pulsed laser beam 312 originating from a pulsed laser beam source 300 may be directed through an aspheric optical element 306 (or other phase-altering optical element) and a lens assembly 130 to produce a pulsed laser beam focal line 313 within the transparent workpiece 1002. The pulsed laser beam focal line 313 may have a non-uniform intensity distribution in some embodiments to generate defects 1004 having a non-uniform damage distribution. In some embodiments, the relative focusing position of the defect forming optical system 200 with respect to the transparent workpiece 1002 may determine the position of various features of the non-uniform damage distribution. Additionally or alternatively, an intensity of the pulsed laser beam 312 emitted from the pulsed laser beam source 300 may impact an overall level of modification of the transparent workpiece 1002 within each defect 1004.

In a step 1204, the plurality of defects 1004 in the transparent workpiece 1002 are illuminated with light from an illumination source. As described herein, the illumination may take place with a single illumination source, such as the first illumination source 1006 or with multiple illumination sources (e.g., with both the first illumination source 1006 and a second illumination source 1008). Generally the first illumination source 1006 provides illumination to the transparent workpiece 1002 through illumination optics 1032. The first illumination source 1006 may be a microscope cold light source, such as an LED, a laser, or any other light source. The illumination optics 1032 are configured to provide the illumination light to the transparent workpiece 1002 at an illumination angle 1036 relative to a surface normal 1050 of a first surface 1052 of the transparent workpiece 1002. For example, in one embodiment, the illumination optics 1032 are an optical fiber configured to provide edge illumination, where the illumination light enters an edge 1058 of the transparent workpiece 1002 at an illumination angle 1036 of approximately 90 degrees (e.g., extends approximately parallel, or within 5 degrees, of the first surface 1052 when the defect direction is aligned with the surface normal 1050). In another embodiment, the illumination optics 1032 are a lens (or lens system) configured to provide low NA illumination light onto the first surface 1052 at smaller illumination angle 1036. As described herein, when multiple illumination sources 1006 and 1008 are used, such multiple illumination sources 1006 and 1008 may produce illumination light having different wavelength and/or polarization to provide sensitivity to different defect features.

In a step 1206, a dark field scattering image signal is measured from light scattered from the plurality of defects 1004 with a first imaging system 1015 disposed at a first imaging angle 1026 from a defect direction 1056 of the plurality of defects 1004. The first imaging system 1015 includes a first camera 1012 and a first imaging lens 1014 disposed on an imaging axis 1030. As described herein, in some embodiments, the first imaging angle 1026 is selected such the entireties of at least a subset of the plurality of defects 1004 (e.g., extending from the first surface 1052 to the second surface 1054) are within a depth of field of the first imaging lens 1014. For example, the magnification and the numeral aperture of the first imaging lens 1014 may be selected based on a thickness of the transparent workpiece 1002 such that the dark field scattering image signal directed to the first camera 1012 contains information regarding entire lengths of the defects 1004 within the subset of defects 1004 imaged. In some embodiments, the scattering image signal is also detected by a second imaging system 1016 disposed at a second imaging angle 1028 from the defect direction 1056 of the plurality of defects 1004. The first and second imaging systems 1015 and 1016 may each be configured to image different portions of the plurality of defects 1004 such that, in combination, the first and second imaging systems 1015 and 1016 image entireties of at least a subset of the plurality of defects 1004 formed in the transparent workpiece 1002.

In a step 1208, intensity profiles for the defects based on the dark field scattering image signal are generated. Image signals generated with cameras 1012 and 1018 may be provided to the computing system 1024, which may analyze portions of the image signals pertaining to individual ones of the defects 1004 to generate intensity profiles such as the one depicted with respect to FIG. 8C. In some embodiments, the computing system 1024 may average a plurality of such intensity profiles, with each profile pertaining to a separate one of the plurality of defects 1004.

In a step 1210, the transparent workpiece 1002 is etched to form etched vias in positions corresponding to defects 1004. Details of the etching process may be found, for example, in U.S. Pat. No. 9,517,963 and U.S. patent application Ser. No. 15/978,430, hereby incorporated by reference in their entireties. In some embodiments, during the step 1210, the etching reaction time can be controlled by adjusting the acid concentration in the etching solution. In some embodiments, the etching solution can be an aqueous solution including deionized water, a primary acid, and a secondary acid. The primary acid can be hydrofluoric acid and the secondary acid can be nitric acid, hydrochloric acid, or sulfuric acid. In some embodiments, the etching solution can only include a primary acid. In some embodiments, the etching solution can include a primary acid other than hydrofluoric acid and/or a second acid other than nitric acid, hydrochloric acid, or sulfuric acid. Exemplary etching solutions can include 10% by volume hydrofluoric acid/15% by volume nitric acid or 5% by volume hydrofluoric acid/7.5% by volume nitric acid.

In some embodiments, orientation of the substrate in the etching tank, mechanical agitation, and the addition of surfactant to the etching solution are other etching conditions that can be modified to adjust the attributes of the via holes. In some embodiments, the etching solution is ultrasonically agitated and the substrate is oriented in the etching tank holding the etching solution so that the top and bottom openings of the damage tracks receive substantially uniform exposure to the ultrasonic waves in order for the damage tracks to be etched uniformly. For example, if the ultrasonic transducers are arranged at the bottom of the etching tank, the substrate can be oriented in the etching tank so that the surfaces of the substrate with the damage tracks are perpendicular to the bottom of the etching tank rather than parallel to the bottom of the etching tank.

In some embodiments, the etching tank can be mechanically agitated in the x, y, and z directions to improve uniform etching of the damage tracks. In some embodiments, the mechanical agitation in the x, y, and z directions can be continuous.

In some embodiments, a surfactant can be added to the etching solution to increase the wettability of the damage tracks. The increased wettability lowers the diffusion time and can allow for increasing the ratio of the diameter of the via hole waist to the diameter of the via hole top and bottom openings. In some embodiments, the surfactant can be any suitable surfactant that dissolves into the etching solution and that does not react with the acid(s) in the etching solution. In some embodiments, the surfactant can be a fluorosurfactant such as Capstone® FS-50 or Capstone® FS-54. In some embodiments, the concentration of the surfactant in terms of ml of surfactant/L of etching solution can be about 1, about 1.1, about 1.2, about 1.3, about 1.4, about 1.5, about 1.6, about 1.7, about 1.8, about 1.9, about 2 or greater.

Temperature adjustments (e.g., 10 degrees Celsius or 50 degrees Celsius) and acid concentration adjustments may be made to change the etch rate. Other mineral acids may be substituted for HCl, such as nitric acid ($HNO_3$). It is also possible to use hydroxide etchants, such as sodium hydroxide (NaOH) and potassium hydroxide (KOH).

In one example, a high purity fused silica transparent workpiece 1002 was etched in a static bath with 20% HF (vol %) and 12% HCL at 47° C., such that the bulk etching rate was 0.0046 µm/s to 0.005 µm/s. In a step 1212, the etched vias formed during step 1210 are imaged. Such images may be obtained by, for example, cutting the transparent workpiece 1002 near a plurality of the etched vias and then taking an image of the cut edge using an optical microscope. The images of the etched vias may also be provided to the computing system 1024 for processing. For example, the computing system 1024 may utilize an edge detection algorithm to determine the lengths of various segments in the etched vias.

In a step 1214, the images of the etched vias obtained in the step 1212 are compared with the intensity profiles of the defects obtained in the step 1208. For example, in some embodiments, lengths of higher damage portions of the defects 1004 identified by the computing system 1024 using the intensity profiles are compared with lengths of portions of the etched vias. These sets of measurements may also be stored in the computing system 1024 to create libraries of datasets. The datasets may contain groupings of laser processing system parameters (e.g., positions of various components in the defect forming optical system 200, a relative focusing position of the defect forming optical system 200, an output intensity of the pulsed laser beam source 300, etc.), defect characteristics (e.g., lengths of the segments AB and CD described herein obtained from the intensity profiles), and etched via characteristics (e.g., waist position, lengths of the segments AB and CD, etc.). Development of such libraries may enable characterization and fine-tuning of the laser processing system and etching process to consistently produce vias having a desired shape.

In a step 1216, the laser processing system is adjusted based on at least one of the intensity profiles, the image of the vias, and the comparison of the image of the vias to the intensity profiles. For example, in one embodiment, it may be determined that the defects 1004 possess an asymmetrical profile. For example, the ratio of the length of the segment AB may not equal the length of the segment CD such that the length ratio substantially differs from 1 by more than 10% (i.e., is between 0.9 and 1.1). Based on the intensity profiles generated at the step 1208, the computing system 1024 (or a user of the laser processing system) may provide an input to the laser processing system to adjust a relative focusing position of the defect forming optical system 200 (e.g., by moving one of the components of the lens assembly 130) so as to produce defects having a symmetrical profile. In another example, based on the intensity profiles having values above or below a particular threshold, the computing system 1024 may identify energy spikes or reductions of the pulsed laser beam source 300, and may temporarily stop defect generation until the output of the pulsed laser beam source 300 outputs light in a desired intensity range. In another example, the comparison of the imaged vias and the intensity profiles may be used to adjust the etching process (e.g., if the defects 1004 are determined to have a desired damage profile, but the vias generated through the etching do not have a desired shape).

In embodiments, data associated with steps 1208, 1210, 1212, and 1214 may be used to characterize the laser-damage-and-etch processes described herein. For example, various datasets or libraries may be built (e.g., stored in a computing system) that contain information with respect to laser processing parameters (e.g., a laser beam energy and focusing position measured via the intensity profiles generated in the step 1208), the etching process used (e.g., etching solution and etching times used to etch the transparent workpiece during the step 1210), and the eventual shape of the vias imaged during the step 1212 (e.g., lengths and angles of various portions of the vias such as the portions 112, 114, 116, and 118 described with respect to FIG. 2A). In embodiments, the computing system may analyze these datasets using, for example, machine learning algorithms to gain various insights with respect to laser-damage-and-etch processes. For example, using historical data, the computing system may generate a predictive algorithm that may predict parameters of an etching process needed to produce vias having a particular shape, given that laser defects having a particular damage profile are present in the transparent workpiece. In another example, the computing system may generate a predictive algorithm that estimates damage profiles of defects needed to generate particular vias, given an etching process being used. As such, the inspection system 1000, by providing quantifiable characteristics of the defects that are relatable back to laser processing apparatus configuration, facilitates an automated characterization of an entire laser-damage-and-etch process.

Figure 13A:
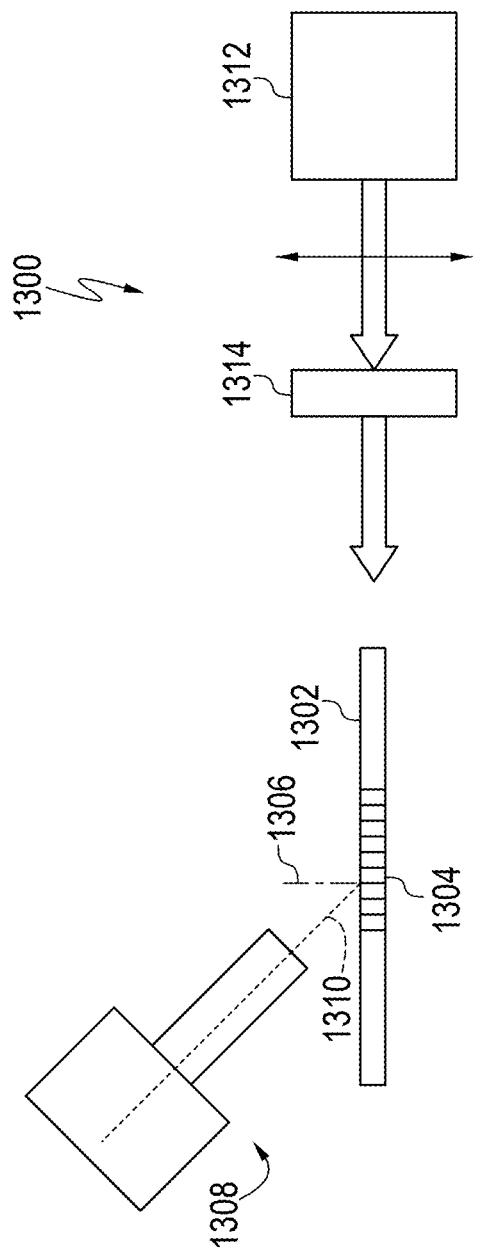
FIG. 13A schematically depicts an inspection system for imaging defects in a transparent workpiece, according to one or more embodiments described herein.

Referring now to FIG. 13A, an inspection system 1300 configured to image a plurality of defects 1304 formed in a transparent workpiece 1302 is shown. The inspection system 1300 includes an illumination source 1312 emitting illumination light. The illumination source 1312 is positioned to direct illumination light through an edge of the transparent workpiece 1302. A polarizing optical element 1314 (e.g., a linear polarizer) is positioned between the illumination source 1312 and the transparent workpiece 1302 to, for example, adjust a polarization of illumination light incident on the transparent workpiece 1302 (e.g., between a vertical polarization in a direction of a surface normal 1306 of the transparent workpiece 1302 and a horizontal polarization). An imaging system 1308 having an imaging axis 1310 disposed at an imaging angle of approximately 45 degrees with respect to the surface normal 1306 is configured to generate an image using illumination light scattered from the plurality of defects 1304.

Figure 13B:
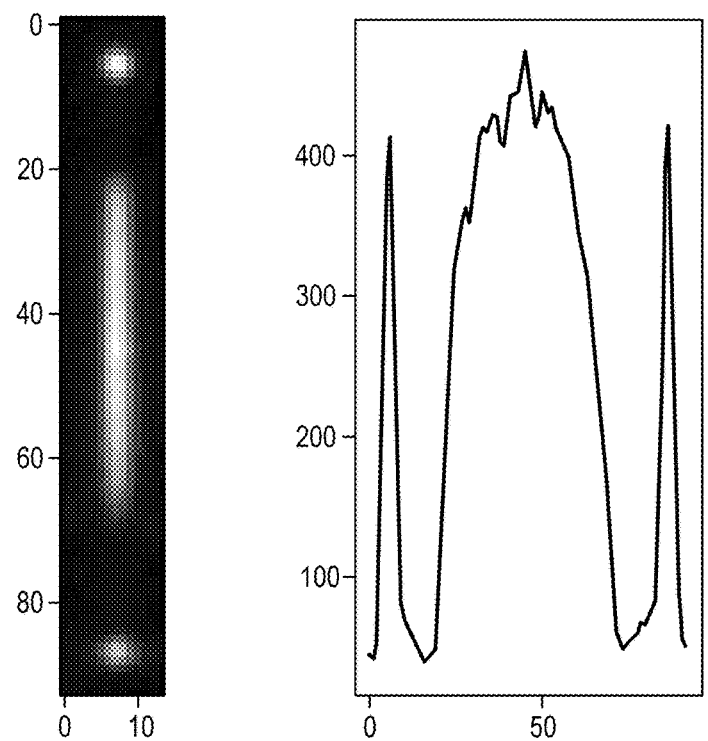
FIG. 13B depicts an image and intensity profile of a defect measured by the inspection system shown in FIG. 13A, according to one or more embodiments described herein.
Figure 13C:
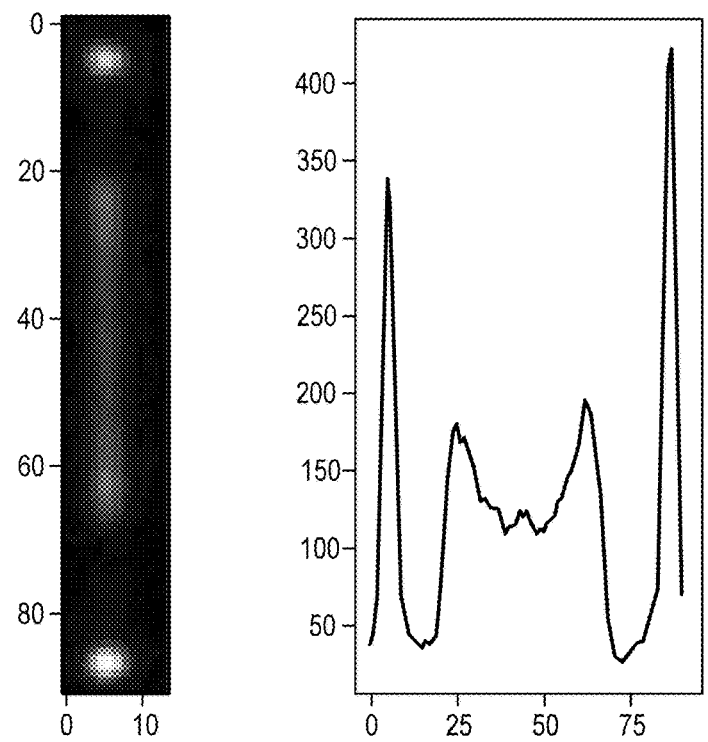
FIG. 13C depicts an image and intensity profile of a defect measured by the inspection system shown in FIG. 13A, according to one or more embodiments described herein.

FIG. 13B depicts an image of one of the defects 1304 and an intensity profile generated from the image when the illumination light from the illumination source 1312 possessed a vertical polarization. FIG. 13C depicts an image of one of the defects 1304 and an intensity profile generated from the image when the illumination light from the illumination source 1312 possessed a horizontal polarization. As shown, there is preferential coupling depending on the polarization of the illumination light. In FIG. 13B, the exterior peaks—corresponding to craters at the surfaces of the transparent workpiece 1302—have intensities that are similar to the central region of the intensity profile. In FIG. 13C, the exterior peaks have intensities that are higher than the central region of the intensity profile. As such, the coupling to the central region appears to vary depending on the polarization of the illumination light in this example. Boundaries of the relatively higher damage regions of the defects may be easier to differentiate due to the more defined peaks in the horizontal polarization image, facilitating the inspection system 1300 more accurately measuring the lengths of different segments of the defects 1304.

In view of the foregoing description, it should be understood that a transparent workpiece possessing a plurality of defects formed therein may be inspected in a non-invasive manner by detecting a scatting image signal from illumination light incident on the plurality of defects at an illumination angle. The methods described herein include using an imaging system having an imaging axis disposed at an angle to a defect direction in which at least a subset of the plurality of defects extend. The imaging system includes an imaging lens disposed on the imaging axis that has a field of view containing the subset of the plurality of defects. A magnification and numerical aperture of the imaging lens is selected such that entireties of the plurality of defects in the subset are contained within a depth of field of the imaging system. The methods described herein include generating image signals based on the scattering image signals directed to an imaging detector via the imaging lens. Beneficially, the image signals reveal quantitative characteristics of the plurality of defects within the subset, such as lengths of various regions in the defects (e.g., high damage segments, lower damage segments, etc.). Beneficially, such quantitative characteristics can be used to characterize and modify a laser processing system used to form the defects such that vias having a desired shape may be consistently formed.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for inspecting a transparent workpiece comprising: directing light from an illumination source onto a plurality of defects formed in the transparent workpiece, wherein the plurality of defects extend in a defect direction, wherein the transparent workpiece comprises a first surface and a second surface; detecting a scattering image signal from light scattered by the plurality of defects using an imaging system, wherein an imaging axis of the imaging system extends at a non-zero imaging angle relative to the defect direction, wherein entireties at least a subset of the plurality of defects are within a depth of field of the imaging system; and generating a three-dimensional image of at least one of the plurality of defects based on the scattering signal;
   wherein the defect comprises a damage pattern that varies as a function of depth in the transparent workpiece and wherein the damage pattern comprises a first portion extending from the first surface, a second portion extending from the second surface, and a third portion extending between the first and second portions, wherein the transparent workpiece has higher levels of modification in the first and second portions as compared to the third portion, wherein the quantitative characteristic of the defect comprises a ratio of a length of the first portion to a length of the second portion.

2. The method of claim 1, wherein the plurality of defects comprise regions of the transparent workpiece where a refractive index of the transparent workpiece has been modified, each of the plurality of defects having an aspect ratio that is a ratio of a length of a defect to a width of a defect, wherein the aspect ratio of each of the plurality of defects is greater than or equal to 20:1.

3. The method of claim 2, wherein each of the plurality of defects comprises an aspect ratio of greater than or equal to 100:1.

4. The method of claim 1, wherein the plurality of defects comprise regions of the transparent workpiece where a refractive index of the transparent workpiece has been modified by exposure to a quasi-non-diffracting laser beam.

5. The method of claim 4, wherein the imaging system comprises second camera and a second imaging lens disposed on a second imaging axis of the imaging system.

6. The method of claim 5, wherein:
   the first camera and first imaging lens are configured to image first portions of the plurality of defects extending from the first surface, and
   the second camera and the second imaging lens are configured to image second portions of the plurality of defects extending from the second surface such that the first and second cameras, in combination, image the entireties of the subset of the plurality of defects.

7. The method of claim 5, further comprising determining a quantitative characteristic of the defect based on the intensity profile.

8. The method of claim 1, wherein the imaging system comprises a first camera and a first imaging lens disposed on the imaging axis, wherein the first camera comprises an area scan camera or a line scan camera, wherein the non-zero imaging angle is from 30 degrees to 60 degrees relative to the defect direction.

9. The method of claim 8, wherein the first imaging lens comprises a magnification factor and a numerical aperture that are dependent on a thickness of the transparent workpiece.

10. The method of claim 9, wherein the thickness of the transparent workpiece is from 300 µm to 700 µm, wherein the magnification factor is less than 3, wherein the numerical aperture is less than 0.2.

11. The method of claim 1, wherein the defect direction is perpendicular to the first and second surfaces of the transparent workpiece.

12. The method of claim 1, wherein the scattering image signal is a dark field scattering image signal and wherein generating the three-dimensional image comprises generating an intensity profile for a portion of the dark field scattering image signal corresponding to a defect of the plurality of defects.

13. The method of claim 1, wherein directing the light from the illumination source onto the plurality of defects comprises directing the light from the illumination source through an edge of the transparent workpiece.

14. A method of characterizing a laser processing system for forming a defect in a transparent workpiece comprising: forming a defect in the transparent workpiece using the laser processing system, wherein the laser processing system is configured to direct a defect forming laser beam into the transparent workpiece to form the defect using a defect forming optical system, wherein the transparent workpiece comprises a first surface and a second surface, wherein the defect extends in a defect direction; after formation of the defect, directing light from an illumination source onto the defect; detecting a dark field scattering image signal of light scattered from the defect using an imaging system, wherein an imaging axis of the imaging system is disposed at a non-zero imaging angle relative to the defect direction; generating an intensity profile for the defect using the dark field scattering image signal; and determining a characteristic of the laser processing system based on the intensity profile;
    wherein the defect comprises a damage pattern that varies as a function of depth in the transparent workpiece and wherein the damage pattern comprises a first portion extending from the first surface, a second portion extending from the second surface, and a third portion extending between the first and second portions, wherein the transparent workpiece has higher levels of modification in the first and second portions as compared to the third portion, wherein the quantitative characteristic of the defect comprises a ratio of a length of the first portion to a length of the second portion.

15. The method of claim 14, wherein the defect forming optical system is configured to direct the defect forming laser beam into a laser beam focal line that at least partially overlaps the transparent workpiece.

16. The method of claim 14, wherein determining the characteristic of the laser processing system includes determining a focusing position of the defect forming optical system based on the intensity profile.

17. The method of claim 16, wherein determining the focusing position of the defect forming optical system based on the intensity profile includes estimating a length ratio of high damage portions of the defect based on a peak distribution of the intensity profile.

18. A method of characterizing a laser processing system comprising: directing light from an illumination source onto a plurality of defects formed in a transparent workpiece using the laser processing system, wherein the defects extend in a defect direction, wherein the transparent workpiece comprises a first surface and a second surface; detecting a dark field scattering image signal from light scattered by the plurality of defects using an imaging system, wherein an imaging axis of the imaging system is disposed at a non-zero imaging angle to the defect direction; generating intensity profiles for the plurality of defects using the dark field scattering image signal; chemically etching the transparent workpiece to form a plurality of vias in the transparent workpiece in positions corresponding to the plurality of defects; generating an image of a via of the plurality of vias; and comparing the image of the via with an intensity profile corresponding to the defect from which the via was formed;
    wherein the defect comprises a damage pattern that varies as a function of depth in the transparent workpiece and wherein the damage pattern comprises a first portion extending from the first surface, a second portion extending from the second surface, and a third portion extending between the first and second portions, wherein the transparent workpiece has higher levels of modification in the first and second portions as compared to the third portion, wherein the quantitative characteristic of the defect comprises a ratio of a length of the first portion to a length of the second portion.

19. The method of claim 18, further comprising forming the plurality of defects in the transparent workpiece using the laser processing system, wherein the laser processing system is configured to direct a defect forming laser beam into the transparent workpiece to form the defect with a defect forming optical system.

20. The method of claim 19, further comprising at least one of:
    determining a focusing position of the defect forming laser beam based on at least one of the generated intensity profiles, the image, and the comparison of the image and the intensity profile; and
    determining a time dependency of an energy of the defect forming laser beam based on the intensity profiles.

* * * * *